(12) United States Patent
Makita et al.

(10) Patent No.: US 12,280,631 B2
(45) Date of Patent: Apr. 22, 2025

(54) SEAT AIR-CONDITIONING DEVICE

(71) Applicant: Panasonic Intellectual Property Management Co., Ltd., Osaka (JP)

(72) Inventors: Yuki Makita, Kanagawa (JP); Kou Komori, Nara (JP); Takeshi Enya, Hyogo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 204 days.

(21) Appl. No.: 18/306,866

(22) Filed: Apr. 25, 2023

(65) Prior Publication Data

US 2023/0256791 A1  Aug. 17, 2023

Related U.S. Application Data

(63) Continuation of application No. PCT/JP2021/035222, filed on Sep. 27, 2021.

(30) Foreign Application Priority Data

Oct. 30, 2020 (JP) .................................. 2020-182145
Jun. 9, 2021 (JP) .................................. 2021-096796

(51) Int. Cl.
*A47C 7/72* (2006.01)
*A47C 7/02* (2006.01)
(Continued)

(52) U.S. Cl.
CPC ....... *B60H 1/00285* (2013.01); *B60N 2/5657* (2013.01)

(58) Field of Classification Search
CPC .. B60N 2/5628; B60N 2/5657; B60N 2/5642; B60H 1/00285
See application file for complete search history.

(56) References Cited

U.S. PATENT DOCUMENTS 10,647,230 B2 * 5/2020 Fujii ..................... B60N 2/5628
11,642,991 B2 * 5/2023 LaBerge .............. B60N 2/5628
165/42
(Continued)

FOREIGN PATENT DOCUMENTS

JP  2012111318 A  6/2012
JP  2015089682 A  5/2015
(Continued)

OTHER PUBLICATIONS

International Search Report, mailed Nov. 22, 2021, for International Application No. PCT/JP2021/035222. (11 pages) (with English translation).
(Continued)

*Primary Examiner* — Shin H Kim
(74) *Attorney, Agent, or Firm* — Seed IP Law Group LLP

(57) ABSTRACT

A seat air-conditioning device includes: a blower; a first ventilation path through which air is drawn in by the blower from a first inlet in a seat base of a seat on which a person sits; a second ventilation path through which the drawn air is discharged from a first outlet in the seat; a third ventilation path that is different from the second ventilation path and through which the drawn air is discharged from a second outlet in the seat; and an outlet ventilation path selection switch that is between the blower and the first and second outlets and selects at least one of the second and third ventilation path to which the drawn air is to be led. The first inlet is vertically below the first outlet and the second outlet.

17 Claims, 12 Drawing Sheets

(51) Int. Cl.
    *A47C 7/14*     (2006.01)
    *B60H 1/00*     (2006.01)
    *B60N 2/56*     (2006.01)

(56) References Cited

U.S. PATENT DOCUMENTS

| | | | |
|---|---|---|---|
| 2007/0095378 A1* | 5/2007 | Ito | H10N 10/17 |
| | | | 136/203 |
| 2011/0186560 A1* | 8/2011 | Kennedy | B60N 2/5657 |
| | | | 219/217 |
| 2012/0129439 A1 | 5/2012 | Ota et al. | |
| 2016/0280038 A1 | 9/2016 | Tanaka et al. | |
| 2018/0272835 A1* | 9/2018 | Fujii | B60H 1/00285 |
| 2019/0047449 A1* | 2/2019 | Fujii | B60N 2/5657 |
| 2019/0283636 A1 | 9/2019 | Imaizumi et al. | |
| 2023/0001129 A1* | 1/2023 | Ito | A61B 5/18 |
| 2023/0256791 A1* | 8/2023 | Makita | B60N 2/0022 |
| | | | 297/180.13 |
| 2023/0311728 A1* | 10/2023 | Maeda | B60N 2/5678 |
| 2024/0286453 A1* | 8/2024 | Nakagawa | B60N 2/5657 |
| 2024/0416714 A1* | 12/2024 | Makita | B60H 1/00 |
| 2024/0416715 A1* | 12/2024 | Maeda | B60H 1/00828 |
| 2024/0424861 A1* | 12/2024 | Nakagawa | B60H 1/00285 |

FOREIGN PATENT DOCUMENTS

| | | |
|---|---|---|
| JP | 2019098924 A | 6/2019 |
| JP | 2019162928 A | 9/2019 |

OTHER PUBLICATIONS

Notice of Reasons for Refusal, mailed Oct. 22, 2024, for Japanese Patent Application No. 2021-096796. (12 pages) (With English Machine Translation).

* cited by examiner

SEAT AIR-CONDITIONING DEVICE

CROSS REFERENCE TO RELATED APPLICATIONS

This is a continuation application of PCT International Application No. PCT/JP2021/035222 filed on Sep. 27, 2021, designating the United States of America, which is based on and claims priority of Japanese Patent Applications No. 2020-182145 filed on Oct. 30, 2020 and No. 2021-096796 filed on Jun. 9, 2021.

FIELD

The present disclosure relates to a seat air-conditioning device that blows air on a person sitting on a seat.

BACKGROUND

Patent Literature (PTL) 1 discloses a conventional vehicle seat air-conditioning device. This vehicle seat air-conditioning device is provided for a vehicle seat and includes: a distribution duct that distributes a seat ventilation path into a path in a seat back and a path in a seat cushion; and a blower that draws in, from an air inlet, conditioned air from an in-vehicle air-conditioning unit for air conditioning inside a vehicle, then blows the air from an air outlet, and leads the air to the distribution duct.

CITATION LIST

Patent Literature

PTL1: Japanese Unexamined Patent Application Publication No. 2015-89682

SUMMARY

However, the vehicle seat air-conditioning device according to PTL 1 can be improved upon.

In view of this, the present disclosure provides a vehicle seat air-conditioning device capable of improving upon the above related art.

In accordance with an aspect of the present disclosure, a seat air-conditioning device for use in a seat includes: a blower; a first ventilation path through which air is led to be drawn in from a first inlet by the blower, the first inlet being provided in a seat base which is included in the seat and on which a person sits; a second ventilation path through which the air led through the first ventilation path by the blower is discharged from a first outlet provided in the seat; a third ventilation path that is different from the second ventilation path and through which the air led through the first ventilation path by the blower is discharged from a second outlet provided in the seat; and an outlet ventilation path selection switch disposed between the blower and the first and second outlets, the outlet ventilation path selection switch being a switch that selects at least one of the second ventilation path or the third ventilation path to which the air led through the first ventilation path is to be led, wherein the first inlet, the first ventilation path, the blower, the outlet ventilation path selection switch, the second ventilation path, the first outlet, the third ventilation path, and the second outlet are provided in the seat, the first inlet is provided vertically below the first outlet and the second outlet, and the air is drawn via the first inlet from a seating surface which is a seating side of the seat base and on which the person sits, and the first ventilation path is disposed in the seat base and leads from the first inlet to the outlet ventilation path selection switch via the blower.

It should be noted that these general and specific aspects may be implemented to any combination of a system, a method, an integrated circuit, and the like.

The seat air-conditioning device according to the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
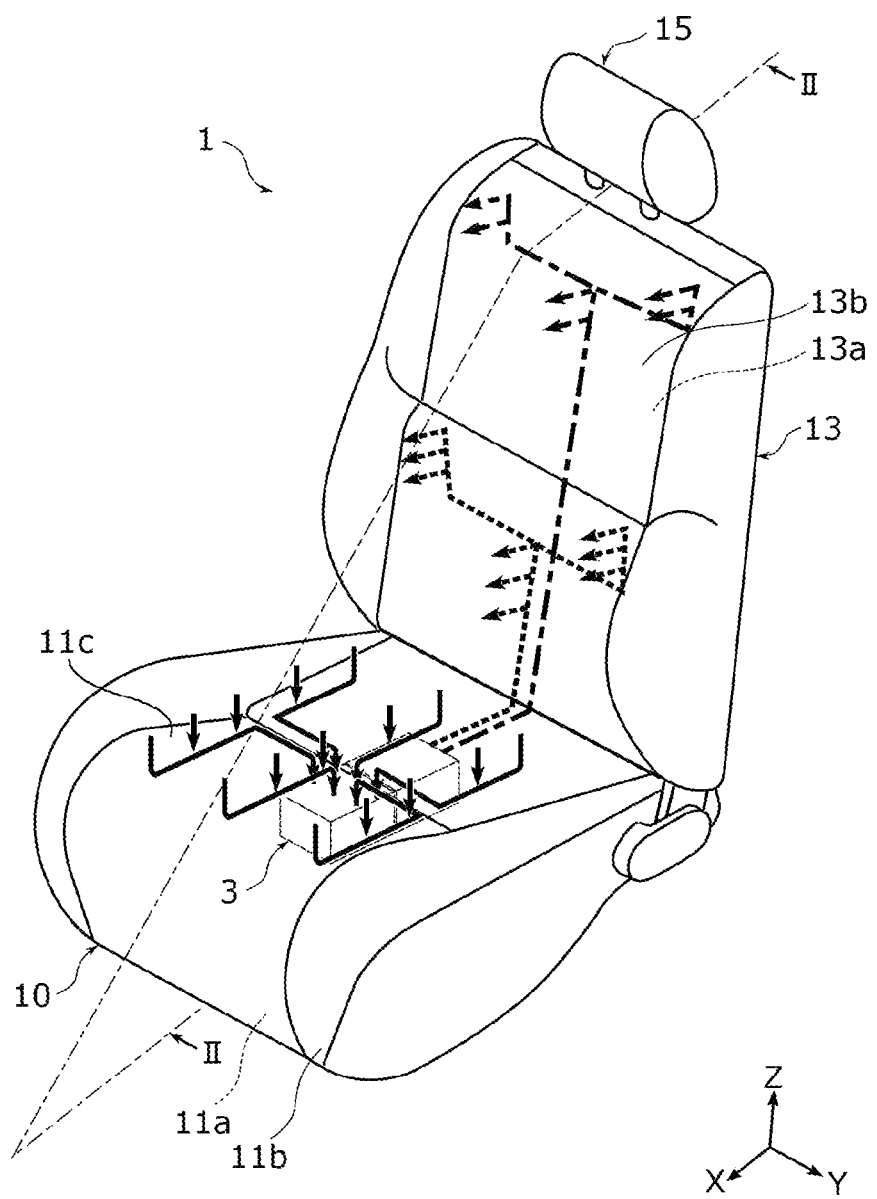
FIG. 1 is an external perspective view of a seat provided with a seat air-conditioning device according to Embodiment.

For example, in many cases, a seat air-conditioning device used as a conventional vehicle seat air-conditioning device includes a blower that is provided for a seat to draw in a part of air discharged from an in-vehicle air-conditioning unit for air conditioning inside a vehicle. However, a part of cool air from the in-vehicle air-conditioning unit that is essentially intended for air-conditioning inside the vehicle in particular is consumed by a heat capacity of the seat getting hot in the scorching sun. For this reason, the entire inside of the vehicle cannot be fully air-conditioned. More specifically, a decrease in the air-conditioning efficiency, including the cooling efficiency and the warming efficiency, often results in inappropriate temperature control of the entire inside of the vehicle. For example, in the summer when the temperature of the vehicle is high, the heat often builds up in the vehicle. On this account, the air drawn into the seat is also hot at startup of the in-vehicle air-conditioning unit, and thus supply of cool air to the seat is difficult.

Therefore, in accordance with an aspect of the present disclosure, a seat air-conditioning device for use in a seat includes: a blower; a first ventilation path through which air is led to be drawn in from a first inlet by the blower, the first inlet being provided in a seat base which is included in the seat and on which a person sits; a second ventilation path through which the air led through the first ventilation path by the blower is discharged from a first outlet provided in the seat; a third ventilation path that is different from the second ventilation path and through which the air led through the first ventilation path by the blower is discharged from a second outlet provided in the seat; and an outlet ventilation path selection switch disposed between the blower and the first and second outlets, the outlet ventilation path selection switch being a switch that selects at least one of the second ventilation path or the third ventilation path to which the air led through the first ventilation path is to be led, wherein the first inlet, the first ventilation path, the blower, the outlet ventilation path selection switch, the second ventilation path, the first outlet, the third ventilation path, and the second outlet are provided in the seat, the first inlet is provided vertically below the first outlet and the second outlet, and the air is drawn via the first inlet from a seating surface which is a seating side of the seat base and on which the person sits, and the first ventilation path is disposed in the seat base and leads from the first inlet to the outlet ventilation path selection switch via the blower.

With this, the blower can draw in the air from the first inlet provided in the seat. More specifically, the air flowing around the seat by convection can be drawn in. For example, a conventional seat air-conditioning device applied to a vehicle directly supplies a seat with a part of cool or warm air that is conditioned by an air-conditioning device of the vehicle. As compared to this, the cool or warm air directly discharged from the seat air-conditioning device according to the present disclosure is less easily consumed by the seat. Thus, the air inside the whole vehicle that is conditioned by the air-conditioning device is drawn in from the first inlet, and then the drawn-in air is discharged from at least one of the first outlet or the second outlet and blown on the person sitting on the seat. As a result, the body of the person can be cooled or warmed.

Thus, the seat air-conditioning device is capable of preventing a decrease in the air-conditioning efficiency.

In particular, the first inlet is provided vertically below the first outlet and the second outlet. Thus, the first inlet can also be disposed at a position corresponding to the legs of the person, and the first outlet and the second outlet can also be provided at positions corresponding to the upper body of the person, for example. In this case, an airflow can be generated near the body of the person by the air drawn in from the first inlet provided in the seating surface near the body of the person. Moreover, the drawn-in air can be discharged toward the person from at least one of the first outlet or the second outlet. As a result, an airflow surrounding the body of the person can be generated, which allows the conditioned air to stay around the person sitting on the seat. This can provide a comfortable air-conditioned environment using a minimum air-conditioning energy. To be more specific, the air can be drawn in from the first inlet provided in the seating surface of the seat, which can prevent the buttocks and thighs in contact with the seating surface from getting sweaty. Furthermore, the first outlet and the second outlet are provided vertically above the first inlet, which allows the air to be blown on the upper body of the person. More specifically, the airflow toward the upper body and the buttocks and thighs can be generated. This allows the conditioned air to stay around the person sitting on the seat, and can also provide a more comfortable air-conditioned environment using a minimum air-conditioning energy.

Assume that the person who is sweating gets in the vehicle in the summer. In this case, the air is not discharged toward the buttocks in particular because the first inlet is vertically below the first outlet and the second outlet. This results in a reduction of discomfort caused by having the sweaty buttocks unnecessarily cooled.

Moreover, the conventional vehicle seat air-conditioning device draws in the air discharged from the in-vehicle air-conditioning unit. However, immediately after the person gets in the vehicle in the summer, the in-vehicle air-conditioning unit is not fully running yet. Thus, warm air is drawn in before cool air is discharged. In other words, the warm air is discharged toward the person. This can cause discomfort to the person. In contrast, the seat air-conditioning device according to an aspect of the present disclosure does not directly draw in the air discharged from the air conditioner (the in-vehicle air-conditioning unit). Thus, the discomfort of the person caused by the discharged warm air can be reduced.

Furthermore, the seat includes the first inlet, the first ventilation path, the blower, the outlet ventilation path selection switch, the second ventilation path, the first outlet, the third ventilation path, and the second outlet that are included in the seat air-conditioning device. This simplifies the configuration.

It is possible in the seat air-conditioning device that the first outlet is disposed vertically below the second outlet.

Thus, the first outlet and the second outlet may be provided at positions corresponding to the upper body of the person, for example. In this case, the first outlet allows the air to be blown on the lower part of the upper body of the person, and the second outlet allows the air to be blown on the upper part of the upper body of the person. In this way, the air can be blown on a predetermined part of the body of the person, and the body can be thereby partly cooled or warmed. This allows the conditioned air to stay around the person sitting on the seat, and can also provide a more comfortable air-conditioned environment using a minimum air-conditioning energy.

It is also possible in the seat air-conditioning device that the outlet ventilation path selection switch includes a first mode in which the air led through the first ventilation path is led to only the second ventilation path to be discharged from the first outlet.

With this, the air can be blown on the lower part of the upper body, such as the buttocks and waist of the person. In other words, the air can be prevented from being blown on the upper part of the upper body, such as the head and neck of the person. The air discharged from the first outlet and blown on the lower part of the upper body of the person is drawn in from the first inlet of the seating surface. To be more specific, the air from the first outlet is drawn in from the first inlet via the lower part of the upper body of the person sitting on the seat. This can generate the airflow that surrounds the person from the lower part of the upper body to the buttocks and thighs.

As a specific example, assume that the person is sitting on the seat for a long time or that a seat heater is turned on while the air conditioner for air-conditioning around the seat performs heating operation. In such a case, the first mode can prevent a body part in contact with the seat from getting sweaty. As another example, assume that the person sits on the seat when the seat is warm or that the air conditioner is turned on when the person is sweating. Immediately after such a case, the first mode, in which no air is discharged from the second outlet, can also prevent the discomfort of overcooling, by blowing no air on the warm head and neck of the person. This allows the conditioned air to stay around the person sitting on the seat, and can also provide a more comfortable air-conditioned environment using a minimum air-conditioning energy.

It is further possible in the seat air-conditioning device that the outlet ventilation path selection switch includes a second mode in which the air led through the first ventilation path is led to only the third ventilation path to be discharged from the second outlet.

With this, the air can be blown on the upper part of the upper body, such as the head and neck of the person. In other words, the air can be prevented from being blown on the lower part of the upper body, such as the buttocks and waist of the person. The air discharged from the second outlet and blown on the upper part of the upper body of the person is drawn in from the first inlet of the seating surface. To be more specific, the air from the second outlet is drawn in from the first inlet via the upper part of the upper body of the person sitting on the seat. This can generate the airflow that surrounds the person from the upper part of the upper body to the buttocks and thighs.

As a specific example, although the heat remaining in the seat decreases as the temperature around the seat is lowered by the air conditioner, the back and waist of the person may be still wet with sweat. In this case, the second mode can cool the shoulders, neck, and head without overcooling the back and waist of the person. This allows the conditioned air to stay around the person sitting on the seat, and can also provide a more comfortable air-conditioned environment using a minimum air-conditioning energy.

It is still further possible in the seat air-conditioning device that the outlet ventilation path selection switch includes a third mode in which the air led through the first ventilation path is led simultaneously to both the second ventilation path and the third ventilation path to be discharged simultaneously from both the first outlet and the second outlet.

With this, the air discharged from the first outlet and the second outlet and blown on the person is drawn in from the first inlet of the seating surface. More specifically, the air discharged from the first outlet and the second outlet is drawn in from the first inlet via the person sitting on the seat. This can generate the airflow that surrounds substantially the whole body of the person from the whole upper body to the buttocks and thighs.

As a specific example, although the heat remaining in the seat is removed as the temperature around the seat is lowered by the air conditioner, heat builds up in the body of the person when the amount of solar radiation is great or when the person is sitting for a long time. In this case, the third mode can cool the whole body of the person. Moreover, if the person wishes to reduce the energy consumption of the air conditioner, the third mode can cool the whole body. This allows the conditioned air to stay around the person sitting on the seat, and can also provide a more comfortable air-conditioned environment. Furthermore, the energy consumption of the system including the air conditioner can be reduced.

It is still further possible that the seat air-conditioning device further includes: a controller that controls the blower and the outlet ventilation path selection switch, wherein the outlet ventilation path selection switch includes: a first mode in which the air led through the first ventilation path is led to only the second ventilation path to be discharged from the first outlet; a second mode in which the air led through the first ventilation path is led to only the third ventilation path to be discharged from the second outlet; and a third mode in which the air led through the first ventilation path is led simultaneously to both the second ventilation path and the third ventilation path to be discharged simultaneously from both the first outlet and the second outlet, and the controller switches the outlet ventilation path selection switch in mode, by selecting one of the first mode, the second mode, and the third mode.

With this, the controller can select one of the first mode, the second mode, and the third mode. This appropriately enables cooling or heating depending on the state or request of the person.

It is still further possible that the seat air-conditioning device further includes at least one of a temperature sensor or a humidity sensor, wherein the controller switches the outlet ventilation path selection switch in mode, based on information indicating a temperature detected by the temperature sensor and information indicating a humidity detected by the humidity sensor.

With this, the temperature and the humidity near the seat can be detected. Thus, the ventilation path selection switch can be switched in mode to generate the airflow that makes the person feel comfortable. Furthermore, the result of the detection of the temperature and the humidity can be outputted to the air conditioner, for example. This allows the air conditioner to perform air-conditioning based on the result of the detection of the temperature and the humidity.

It is still further possible in the seat air-conditioning device that the at least one of the temperature sensor or the humidity sensor is disposed in one of the first ventilation path and the outlet ventilation path selection switch.

With this, the temperature and the humidity of the surface of the seat, or more specifically, the temperature equivalent to that of the buttocks and thighs of the person sitting on the seat and the humidity equivalent to that between the seating surface and the buttocks and thighs can be accurately detected. Thus, the outlet ventilation path selection switch can be switched in mode to generate the airflow that makes the person feel more comfortable.

It is still further possible in the seat air-conditioning device that the first ventilation path communicates with a second inlet different from the first inlet, and the second inlet is disposed on a surface other than the seating surface of the seat.

With this, the first ventilation path communicates not only with the first inlet, but also with the second inlet. Thus, the air drawn in from the first inlet between the seating surface and the person can be mixed with the air drawn in from the second inlet provided in a position other than the seating surface. In this way, the air around the seat is actively taken in, which provides a more comfortable air-conditioned environment to the person sitting on the seat.

It is still further possible in the seat air-conditioning device that the first outlet is disposed at a position corresponding to at least one of back or waist of the person, and that the second outlet is disposed at a position corresponding to at least one of a head, a neck, or a shoulder of the person.

With this, the air discharged from the first outlet is blown on at least one of the back or the waist of the person, and the air discharged from the second outlet is blown on at least one of the head, the neck, or the shoulders of the person. As a result, a part of the body of the person can be cooled or warmed, and thus substantially the whole body of the person can be cooled or warmed. This allows the conditioned air to stay around the person sitting on the seat, and can also provide a more comfortable air-conditioned environment using a minimum air-conditioning energy.

It is still further possible in the seat air-conditioning device that when the blower is driven, the controller switches the outlet ventilation path selection switch firstly to the first mode, then to the second mode, and then to the third mode.

With this, during a period, especially in the summer, from immediately after the person gets in the vehicle until when cooling by the air conditioner starts to work, the seat air-conditioning is executed in the mode adapting to the ever-changing in-vehicle environment. This allows the conditioned air to stay around the person sitting on the seat, and can also provide a more comfortable air-conditioned environment using a minimum air-conditioning energy.

It is still further possible in the seat air-conditioning device that when the controller determines, based on at least one of the information indicating the temperature detected by the temperature sensor or the information indicating the humidity detected by the humidity sensor, that at least one of the temperature or the humidity is stabilized within a predetermined range, the controller switches the outlet ventilation path selection switch to the first mode.

With this, when cooling by the air conditioner is stabilized, the air is discharged toward the back and waist and is not discharged toward the head, neck, and shoulders. This prevents the head, neck, and shoulders from being overcooled, and also keeps the airflow surrounding the back, waist, and legs. As a result, a comfortable air-conditioned environment can be maintained.

It is still further possible in the seat air-conditioning device that the first inlet is provided in each of a center portion and an outer edge portion of the seating surface.

With this, between the seating surface and the buttocks and thighs, the air drawn in from the first inlet provided in the center portion of the seating surface can prevent the buttocks and thighs of the person from being sweaty. Furthermore, the first inlet provided in the outer edge portion of the seating surface is less likely to be covered by the buttocks and thighs of the person and thus can draw in the air around the seat. For example, if the first inlet provided in the center portion of the seating surface is unable to draw in the air, the first inlet provided in the outer edge portion of the seating surface is able to draw in the air. Thus, the air can be discharged from the first outlet and the second outlet.

It is still further possible in the seat air-conditioning device that the outer edge portion is at least one of a rear portion or a front edge portion of the seating surface.

With this, especially the rear portion and the front edge portion of the outer edge portion of the seating surface are even less likely to be covered by the buttocks and thighs of the person. This increases the accuracy of air suction from the first inlet.

It is still further possible that the seat air-conditioning device further includes: a second inlet that is disposed at a position different from a position of the first inlet; a fourth ventilation path that is connected to the second inlet; and an inlet ventilation path selection switch that is connected to the first ventilation path and the fourth ventilation path, wherein the inlet ventilation path selection switch is connected to the controller, the blower is connected between the inlet ventilation path selection switch and the outlet ventilation path selection switch, the inlet ventilation path selection switch includes: a fourth mode in which the first ventilation path is connected to the blower; a fifth mode in which the fourth ventilation path is connected to the blower; and a sixth mode in which the first ventilation path and the fourth ventilation path are connected to the blower, and the controller switches the inlet ventilation path selection switch in mode, by selecting one of the fourth mode, the fifth mode, and the sixth mode.

This enables selection between, or mixture of, the air drawn in from the first inlet provided between the seating surface and the person and the air drawn in from the second inlet provided in a position other than the seating surface. If the temperature of the air drawn in from the second inlet is different from the temperature of the air drawn in from the first inlet, the temperature can be adjusted more finely through the air selection or the air mixture. This can provide a more comfortable air-conditioned environment to the person sitting on the seat.

It is still further possible in the seat air-conditioning device that the controller performs an operation procedure by (1) switching the inlet ventilation path selection switch to the fourth mode and switching the outlet ventilation path selection switch to the first mode, (2) switching the inlet ventilation path selection switch to the fifth mode and switching the outlet ventilation path selection switch to the second mode, (3) switching the inlet ventilation path selection switch to the sixth mode, (4) switching the inlet ventilation path selection switch to the fourth mode, and (5) switching the outlet ventilation path selection switch to the third mode.

With this, even if cool air is not blown from the air conditioner when the person gets in the vehicle in the middle of summer for example, operation (1) first causes the air to be blown only on the waist and back of the person so that heat of vaporization of sweat causes cool feeling. At this time, no air is blown on the neck and shoulders to keep the neck and shoulders out of lukewarm air. Next, operation (2) causes cool air to be actively taken in from the second inlet as the cool air starts blowing from the air conditioner, stops the air blowing on the waist and back wet with sweat (to prevent overcooling), and causes the air to be blown on the neck and shoulders to cool the neck and shoulders. Next, operation (3) causes the air to be drawn in also from the first inlet of the seating surface and thereby starts generating the airflow that surrounds the person to increase the comfort. Next, operation (4) causes only the airflow surrounding the person to be generated and stops the taking in of the cool air from the air conditioner to prevent overcooling. Next, operation (5) causes the air to be blown not only on the neck and shoulders but also on the waist and back to prevent the heat from building up in the waist and back due to a long drive. This operation procedure included in the control performed by the controller can increase the comfort in the vehicle especially in the middle of summer.

It is still further possible in the seat air-conditioning device that when the inlet ventilation path selection switch is continuously kept in one of the fourth mode and the sixth mode for a first predetermined period, the controller switches the inlet ventilation path selection switch to the fifth mode and also alternates the outlet ventilation path selection switch between the first mode and the second mode, for a second predetermined period.

With this, generation of the airflow surrounding the person continues. Especially when the tension of the driver reduces, the air of the air conditioner that is different in temperature from the seating surface (the first inlet) is drawn in only from the second inlet and the air is blown alternately on the waist and back and on the neck and shoulders. With this, the driver can be cautioned.

In the present embodiment, note that the neck includes the upper back near the neck and that the shoulders include the upper body near the shoulders.

The following embodiments are general or specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

It should be noted that the respective figures are schematic diagrams and are not necessarily precise illustrations. Additionally, components that are essentially the same share like reference signs in the figures. It should also be noted that the following embodiments may include expressions using "substantially", such as substantially rectangular. For example, substantially rectangular means not only completely rectangular but also practically rectangular. For example, substantially rectangular includes a difference of about several % from completely rectangular. The other expressions using "substantially" have the same meaning.

In the following description, an X-axis direction refers to the forward-backward direction of the seat and a Z-axis direction refers to the upward-downward direction. Furthermore, a Y-axis direction refers to the rightward-leftward direction, or more specifically, the direction perpendicular to both the X-axis direction and the Z-axis direction. The forward side of the seat in the X-axis direction is referred to as the positive side in the X-axis direction. The backward side of the seat in the X-axis direction is referred to as the negative side in the X-axis direction. Furthermore, the leftward side of the seat in the Y-axis direction (the right forward side as viewed in FIG. 1) is referred to as the positive side in the Y-axis direction. The opposite side of the seat in the Y-axis direction is referred to as the negative side in the Y-axis direction. Here, the rightward side is defined with respect to a person who is sitting on the seat and facing in the traveling direction of the vehicle, and thus is the Y-axis negative direction. The leftward side is defined with respect to the person who is sitting on the seat and facing in the traveling direction of the vehicle, and thus is the Y-axis positive direction. Furthermore, the upward side of the seat in the Z-axis direction is referred to as the positive side in the Z-axis direction. The downward side of the seat in the Z-axis direction is referred to as the negative side in the Z-axis direction. These terms are equally used for FIG. 2 and subsequent figures.

The following describes Embodiment in detail, with reference to the drawings.

Embodiment

<Configuration: Seat 1>

Figure 2:
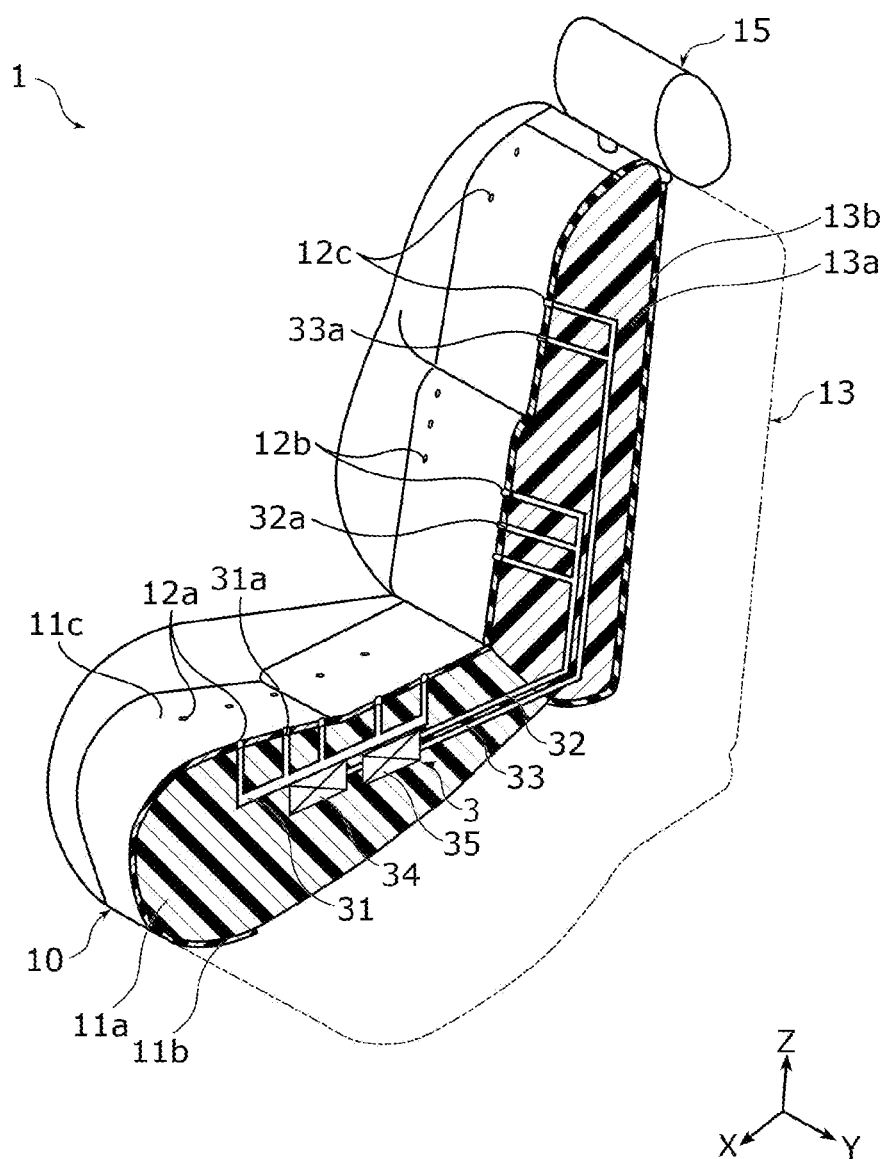
FIG. 2 is a diagram illustrating an external perspective view of the seat provided with the seat air-conditioning device, together with a cross-sectional view of the seat taken along line II-II in FIG. 1.
Figure 3:
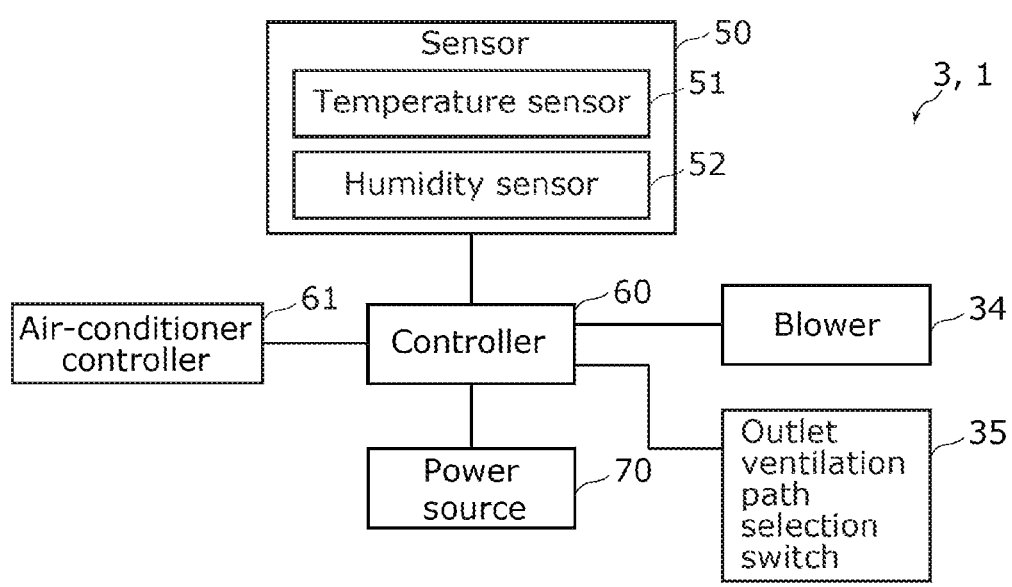
FIG. 3 is a block diagram illustrating the seat air-conditioning device according to Embodiment.

FIG. 1 is an external perspective view of seat 1 provided with seat air-conditioning device 3 according to Embodiment. FIG. 2 is a diagram illustrating an external perspective view of seat 1 provided with seat air-conditioning device 3, together with a cross-sectional view of seat 1 taken along line II-II in FIG. 1. FIG. 3 is a block diagram illustrating seat air-conditioning device 3 according to Embodiment.

As illustrated in FIG. 1 to FIG. 3, seat 1 included in, for instance, a vehicle cools or warms a person sitting on seat 1 by blowing air on the upper body of the person. To be more specific, seat 1 is capable of cooling or warming the body of the person by blowing air on the head, neck, shoulders, back, and waist of the person sitting on seat 1. Furthermore, seat 1 is capable of generating an airflow by drawing in air from positions corresponding to the buttocks and thighs, and thereby reducing sweatiness between seat 1 and the buttocks and thighs. Seat 1 described above includes seat base 10 on which the person sits, seat back 13, headrest 15, seat air-conditioning device 3, and power source 70.

[Seat Base 10]

As illustrated in FIG. 1 and FIG. 2, seat base 10 is a seat cushion that supports the buttocks and thighs of the person sitting on seat 1. Seat base 10 includes: first seat pad 11a that is an equivalent of a cushion material; and first seat cover 11b that covers first seat pad 11a.

First seat pad 11a is made of urethane foam for example, and forms a seat base body. First seat pad 11a has a thick, substantially rectangular board-like structure, and is disposed substantially parallel to the X-Y plane. First seat pad 11a supports the buttocks and thighs of the sitting person.

First seat pad 11a includes first ventilation path 31 through which air is led to be drawn in from first vent 12a of seating surface 11c, which is a surface of first seat cover 11b on the positive side in the Z-axis direction. Furthermore, first ventilation path 31, a part of second ventilation path 32, a part of third ventilation path 33, blower 34, and outlet ventilation path selection switch 35, which are components of seat air-conditioning device 3, are disposed directly under first seat pad 11a. To be more specific, each of these components is fixed to a spring disposed directly under first seat pad 11a. Note that the spring is not shown in FIG. 2. The fixing of the components of seat air-conditioning device 3 to the spring is not intended to be limiting. These components may be fixed to a seat frame disposed at a front portion of first seat pad 11a. Activation of blower 34 causes air to flow into first ventilation path 31 of first seat pad 11a. First ventilation path 31 disposed in first seat pad 11a may simply be a through hole provided in first seat pad 11a, or may be a ventilation duct.

First seat cover 11b covers first seat pad 11a. For example, first seat cover 11b is a leather cover or a fiber cover.

First seat cover 11b includes first vent 12a from which air is drawn in. First vent 12a is provided on seating surface 11c which is a seating side of seat base 10 and on which the person sits (that is, the surface on the positive side in the Z-axis direction). First vent 12a is provided at a position corresponding to first inlet 31a of seat air-conditioning device 3. In the present embodiment, a plurality of first vents 12a are arranged along the X-axis direction with respect to first seat cover 11b and also arranged in a plurality of rows in the Y-axis direction. In FIG. 1, the solid arrows indicate first vents 12a.

Air drawn in from first vent 12a is led to first inlet 31a of seat air-conditioning device 3, drawn in from first inlet 31a, and then led through first ventilation path 31. On this account, first vent 12a also serves as an inlet that draws in air flowing above seating surface 11c by convection, under suction from first inlet 31a as a result of the activation of seat air-conditioning device 3. Note that first vent 12a may be a part of first ventilation path 31. In this case, first vent 12a is an example of the first inlet.

[Seat Back 13]

Seat back 13 is a backrest that supports the shoulders, back, and waist of the person sitting on seat 1. Seat back 13 is long in the Z-axis direction and disposed to sit up with respect to seat base 10. Seat back 13 includes: second seat pad 13a that is an equivalent of a cushion material; and second seat cover 13b that covers second seat pad 13a.

Second seat pad 13a is made of urethane foam for example, and has a structure in a lower part of seat back 13 to adjust, according to a posture, a backrest angle with respect to the Y axis as the center. Second seat pad 13a supports the shoulders, back, and waist of the sitting person.

Second seat pad 13a includes a part of second ventilation path 32 and a part of third ventilation path 33 disposed for discharging air drawn in from first vent 12a. Air flown into first ventilation path 31 of first seat pad 11a as a result of the activation of blower 34 is discharged to second seat pad 13a from at least one of first outlet 32a of second ventilation path 32 or second outlet 33a of third ventilation path 33. Second ventilation path 32 and third ventilation path 33 provided in second seat pad 13a may simply be through holes provided in first seat pad 11a, or may be ventilation ducts.

Second seat cover 13b covers second seat pad 13a. For example, second seat cover 13b is a leather cover or a fiber cover.

Second seat cover 13b includes second vent 12b and third vent 12c provided for discharging the drawn-in air. Second vent 12b is provided on a surface opposite to the person sitting on seat base 10 (that is, the surface on the positive side in the X-axis direction). Second vent 12b is provided at a position corresponding to first outlet 32a of second ventilation path 32. Furthermore, third vent 12c is provided on the surface opposite to the person sitting on seat base 10. Third vent 12c is provided at a position corresponding to second outlet 33a of third ventilation path 33. Third vent 12c is provided vertically above second vent 12b, or more specifically, provided on the positive side in the Z-axis direction with respect to second vent 12b. In the present embodiment, second seat cover 13b includes a plurality of second vents 12b and a plurality of third vents 12c. In FIG. 1, the dashed arrows indicate second ventilation path 32, and the alternate long and short dashed arrows indicate third ventilation path 33.

More specifically, the plurality of second vents 12b are divided into three groups. A first group of the three groups is provided in a center portion of second seat cover 13b in the Y-axis direction. The other two groups, a second group and a third group, are provided in second seat cover 13b on both sides of the center portion in the Y-axis positive direction and the Y-axis negative direction. To be more specific, the first group is provided in a portion of second seat cover 13b, corresponding to at least one of the back of the person or the waist of the person. The second group and the third group are provided in positions corresponding to both arms or both sides.

Furthermore, the plurality of third vents 12c are also divided into three groups. A fourth group of the three groups is provided in the center portion of second seat cover 13b in the Y-axis direction. The other two groups, a fifth group and a sixth group, are provided in second seat cover 13b on both sides of the center portion in the Y-axis positive direction and the Y-axis negative direction. For example, the fourth group is provided in a portion of second seat cover 13b, corresponding to at least one of the head, neck, or shoulders of the person. The fifth group and the sixth group are provided in positions corresponding to both ears or shoulders.

Air led through first ventilation path 31 and second ventilation path 32 and then discharged from first outlet 32a passes through the plurality of second vents 12b. More specifically, air led through first ventilation path 31 and second ventilation path 32 and discharged from first outlet 32a as a result of the activation of seat air-conditioning device 3 is led to second vent 12b. On this account, second vent 12b also serves as an outlet through which air is discharged to the outside of seat 1. Note that second vent 12b may be a part of second ventilation path 32. In this case, second vent 12b is an example of the first outlet.

Similarly, air led through first ventilation path 31 and third ventilation path 33 and then discharged from second outlet 33a passes through the plurality of third vents 12c. More specifically, air led through first ventilation path 31 and third ventilation path 33 and discharged from second outlet 33a as a result of the activation of seat air-conditioning device 3 is led to second vent 12b. On this account, third vent 12c also serves as an outlet through which air is discharged to the outside of seat 1. Note that third vent 12c may be a part of third ventilation path 33. In this case, third vent 12c is an example of the second outlet.

[Headrest 15]

Headrest 15 is a head supporter that supports the head of the person sitting on seat 1. Headrest 15 is fixed to an end part of seat back 13 on the positive side in the Z-axis direction.

Note that third vent 12c may be provided in headrest 15. To be more specific, a part of third ventilation path 33 may be provided in headrest 15.

[Seat Air-Conditioning Device 3]

Seat air-conditioning device 3 is included in seat 1 and capable of blowing air on the person sitting on seat 1 from behind the person. Seat air-conditioning device 3 performs the air blowing, by drawing in air that flows around seat 1 by convection and then blowing the drawn-in air. Thus, the air blown is warm if a temperature around seat 1 is higher than ordinary temperature and is cool if the temperature is lower than ordinary temperature. Note that seat air-conditioning device 3 may include an air conditioner capable of heating and cooling.

Figure 4:
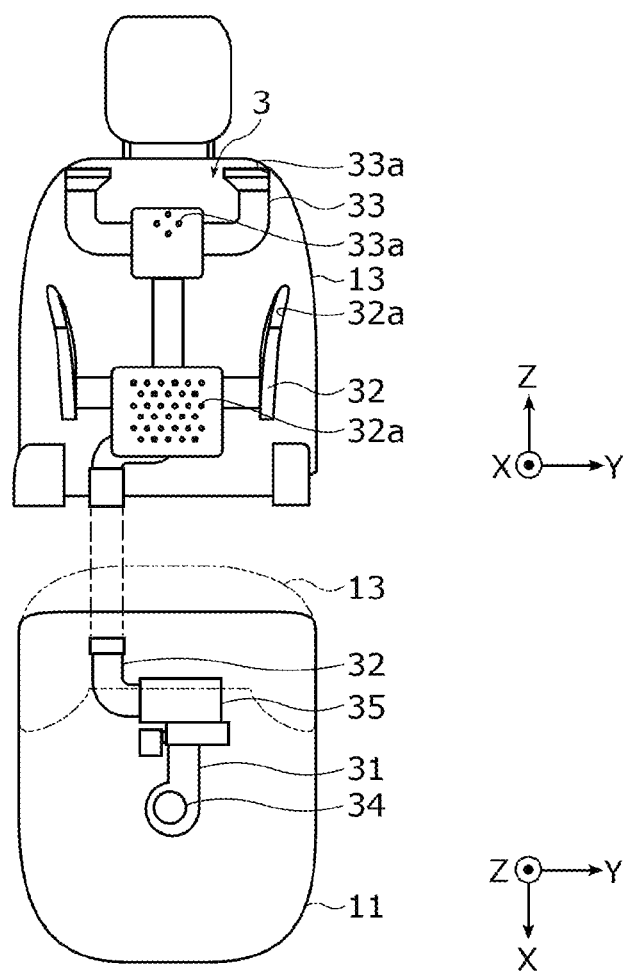
FIG. 4 is a diagram illustrating a plan view of the seat air-conditioning device when a seat back is viewed from the front and a top view of the seat air-conditioning device when a seat base is viewed from above.

FIG. 4 is a diagram illustrating a plan view of seat air-conditioning device 3 when seat back 13 is viewed from the front and a top view of seat air-conditioning device 3 when seat base 10 is viewed from above.

As illustrated in FIG. 2 to FIG. 4, seat air-conditioning device 3 includes blower 34, first ventilation path 31, second ventilation path 32, third ventilation path 33, outlet ventilation path selection switch 35, sensor 50, and controller 60.

Blower 34 is capable of drawing in air from first vent 12a provided in first seat cover 11b of seat 1, and discharging the drawn-in air from second vent 12b and third vent 12c provided in second seat pad 13a. To be more specific, blower 34 is electrically connected to controller 60. Under the drive control of controller 60, blower 34 draws in air from first inlet 31a via first vent 12a, discharges the drawn-in air from first outlet 32a via first ventilation path 31, outlet ventilation path selection switch 35, and second ventilation path 32, and discharges the drawn-in air from second outlet 33a via first ventilation path 31, outlet ventilation path selection switch 35, and third ventilation path 33.

To draw in air from first inlet 31a of first seat cover 11b, blower 34 is provided in first seat pad 11a (directly below first seat pad 11a in the present embodiment). In the present embodiment, blower 34 is disposed on first ventilation path 31. However, if an airflow path allows air to flow from first inlet 31 of first ventilation path 31 to outlet ventilation path selection switch 35, blower 34 may be disposed outside first ventilation path 31. Blower 34 may be disposed outside first seat pad 11*a*. The position of blower 34 is not limited to a particular place.

First ventilation path 31 is a path through which the air is led to be drawn in by blower 34 from first inlet 31*a* provided in seat base of seat 1. More specifically, the air flows inside first ventilation path 31. First ventilation path 31 is formed of a ventilation duct, for example. One end of first ventilation path 31 forms first inlet 31*a*, and the other end is connected to outlet ventilation path selection switch 35 via blower 34. To be more specific, first ventilation path 31 leads from first inlet 31*a* to outlet ventilation path selection switch via blower 34. First inlet 31*a* is capable of drawing in air from the surface which is the seating side of seat base 10 and on which the person sits (that is, seating surface 11*c*). First inlet 31*a* corresponds to first vent 12*a* of first seat cover 11*b*. First inlet 31*a* overlaps with first vent 12*a* when viewed in the Z-axis direction. In the present embodiment, first inlet 31*a* draws in air via first vent 12*a*. However, first inlet 31*a* may be configured to directly draw in air.

The air led through first ventilation path 31 by blower 34 flows inside second ventilation path 32 and is discharged from first outlet 32*a* provided in seat back 13 of seat 1. Second ventilation path 32 is formed of a ventilation duct, for example. One end of second ventilation path 32 forms first outlet 32*a*, and the other end is connected to outlet ventilation path selection switch 35. First outlet 32*a* corresponds to second vent 12*b* of second seat cover 13*b*. First outlet 32*a* overlaps with second vent 12*b* when viewed in the X-axis direction. In the present embodiment, first outlet 32*a* discharges air via second vent 12*b*. However, first outlet 32*a* may be configured to directly discharge air.

Second ventilation path 32 leads from outlet ventilation path selection switch 35 to first outlet 32*a*. In the present embodiment, second ventilation path 32 extends from outlet ventilation path selection switch 35 of first seat pad 11*a* to second seat pad 13*a*. In the present embodiment, second ventilation path 32 has a substantially Y-shaped structure that extends to the vicinity of second vents 12*b* (the first group) provided in the center portion of second seat cover 13*b* in the Y-axis direction and then extends, from this vicinity of the first group, to both sides in the Y-axis positive and negative directions. First outlets 32*a* are provided at positions of second ventilation path 32 corresponding to this first group and at ends of second ventilation path 32 extending to the both sides. To be more specific, first outlet 32*a* is provided at a position corresponding to at least one of the back or the waist of the person.

Third ventilation path 33 is different from second ventilation path 32. The air led through first ventilation path 31 by blower 34 flows inside third ventilation path 33 and is discharged from second outlet 33*a* provided in seat back 13 of seat 1. Third ventilation path 33 is formed of a ventilation duct, for example. One end of third ventilation path 33 forms second outlet 33*a*, and the other end is connected to outlet ventilation path selection switch 35. Second outlet 33*a* corresponds to third vent 12*c* of second seat cover 13*b*. Second outlet 33*a* overlaps with third vent 12*c* when viewed in the X-axis direction. In the present embodiment, second outlet 33*a* is an outlet through which air is discharged via third vent 12*b*. However, the air may be discharged directly from second outlet 33*a*.

Third ventilation path 33 leads from outlet ventilation path selection switch 35 to second outlet 33*a*. In the present embodiment, third ventilation path 33 extends from outlet ventilation path selection switch 35 of first seat pad 11*a* to second seat pad 13*a*. In the present embodiment, third ventilation path 33 has a substantially Y-shaped structure that extends to the vicinity of third vents 12*c* (the fourth group) provided in the center portion of second seat cover 13*b* in the Y-axis direction and then extends, from this vicinity of the fourth group, to both sides in the Y-axis positive and negative directions. Second outlets 33*a* are provided at positions of third ventilation path 33 corresponding to this fourth group and at ends of third ventilation path 33 extending to the both sides. To be more specific, second outlet 33*a* is provided at a position corresponding to at least one of the head, the neck, or the shoulders of the person.

The configurations of first ventilation path 31, second ventilation path 32, and third ventilation path 33 as described above allow first inlet 31, first outlet 32*a*, and second outlet 33*a* to have the following relationship. First inlet 31*a* is provided vertically below first outlet 32*a* and second outlet 33*a*. Furthermore, first outlet 32*a* is provided vertically below second outlet 33*a*. Thus, the air drawn in from the positions corresponding to the buttocks and thighs is discharged from the positions corresponding to the head, neck, shoulders, back, and waist of the person. This generates an airflow that surrounds the person sitting on seat 1.

Outlet ventilation path selection switch 35 is disposed between blower 34 and first and second outlets 32*a*, 33*a*. Outlet ventilation path selection switch 35 selectively leads the air led through first ventilation path 31 to at least one of second ventilation path 32 or third ventilation path 33. Outlet ventilation path selection switch 35 is formed of a damper for example, and is capable of switching the airflow path, that is, the ventilation path. For the air led through first ventilation path 31, outlet ventilation path selection switch 35 is disposed downstream of blower 34. Outlet ventilation path selection switch 35 is capable of selectively leading the air led through first ventilation path 31 through only second ventilation path 32, through only third ventilation path, or through both second ventilation path 32 and third ventilation path 33 simultaneously.

More specifically, outlet ventilation path selection switch 35 has a first mode, a second mode, and a third mode. In the first mode, the air led through first ventilation path is led through only second ventilation path 32 to be discharged from first outlet 32*a*. In the second mode, the air led through first ventilation path 31 is led through only third ventilation path 33 to be discharged from second outlet 33*a*. In the third mode, the air led through first ventilation path 31 is led simultaneously through both second ventilation path 32 and third ventilation path 33 to be discharged simultaneously from both first outlet 32*a* and second outlet 33*a*. Outlet ventilation path selection switch 35 is electrically connected to controller 60. Under the drive control of controller 60, one of the first mode, the second mode, and the third mode is selected.

[Sensor 50]

Sensor 50 detects a state of seat 1 and a state of the person sitting on seat 1.

More specifically, sensor 50 detects at least one of a temperature or a humidity of the air led through first ventilation path 31, as the state of seat 1. Sensor 50 includes temperature sensor 51 and humidity sensor 52. Seat air-conditioning device 3 according to the present embodiment uses both temperature 51 and humidity sensor 52 as sensor 50. In the present embodiment, seat air-conditioning device 30 may include at least one of temperature sensor 51 or humidity sensor 52. Here, humidity sensor 52 measures a relative humidity and outputs the result.

Temperature sensor 51 and humidity sensor 52 are disposed in first ventilation path 31 or outlet ventilation path selection switch 35. This allows temperature sensor 51 and humidity sensor 52 to accurately detect a temperature equivalent to that of the buttocks and thighs of the person sitting on seat 1 and a humidity equivalent to that between seating surface 11c and the buttocks and thighs. Temperature sensor 51 and humidity sensor 52 output, to controller 60, information indicating the temperature and information indicating the humidity as a result of the detection.

Furthermore, sensor 50 detects the state of the person. The state of the person includes a sweating state of the person and a sitting duration of the person. For example, sensor 50 may include a sensor that detects the sitting duration of the person sitting on seat 1, and may also include an imaging device that images the person. To detect the sitting duration, sensor 50 may reference to an activation duration of the vehicle or may detect a duration during which the presence of the person is continuously detected, for example. Sensor 50 may output, to controller 60, information indicating the sitting duration as a result of the detection. Furthermore, sensor 50 may detect the sweating state of the person by imaging the person. Sensor 50 may output, to controller 60, information indicating the sweating state of the person as a result of the detection.

[Controller 60]

Controller 60 controls blower 34 and outlet ventilation path selection switch 35. Controller 60 is a microcomputer that turns on or off the current passing through blower 34 and outlet ventilation path selection switch 35 and that controls output of blower 34 by changing a current value.

Controller 60 switches outlet ventilation path selection switch in mode by selecting one of the first mode, the second mode, and the third mode. Controller 60 may switch outlet ventilation path selection switch 35 in mode, based on at least one of the information indicating the temperature detected by temperature sensor 51 or the information indicating the humidity detected by humidity sensor 52.

For example, controller 60 may switch outlet ventilation path selection switch 35 in mode, based on the result of the detection performed by sensor 50. To be more specific, controller 60 may perform the control to switch outlet ventilation path selection switch in mode, based on the sweating state of the person detected by imaging the state of the person using sensor 50, such as an imaging device. Alternatively, controller 60 may perform the control to switch outlet ventilation path selection switch 35 in mode, based on the temperature around seat 1 while the person is sitting on seat 1 for example.

Furthermore, controller 60 may have a function of communicating with a controller of an air conditioner (hereinafter, referred to as air-conditioner controller 61) included in the vehicle. In this case, controller 60 transmits the result of the detection performed by sensor 50 to air-conditioner controller 61, and receives an operating state of the air conditioner. In the present embodiment, controller 60 is electrically connected to air-conditioner controller 61 as illustrated in FIG. 3.

[Power Source 70]

Power source 70 is a power circuit that supplies electric power to blower 34 and outlet ventilation path selection switch 35 via controller 60 for example. Here, power source 70 refers to direct current supplied from a battery that is not shown. Under the control of controller 60, power source 70 adjusts the current to be supplied to blower 34 and outlet ventilation path selection switch 35.

<Processing>

Figure 5:
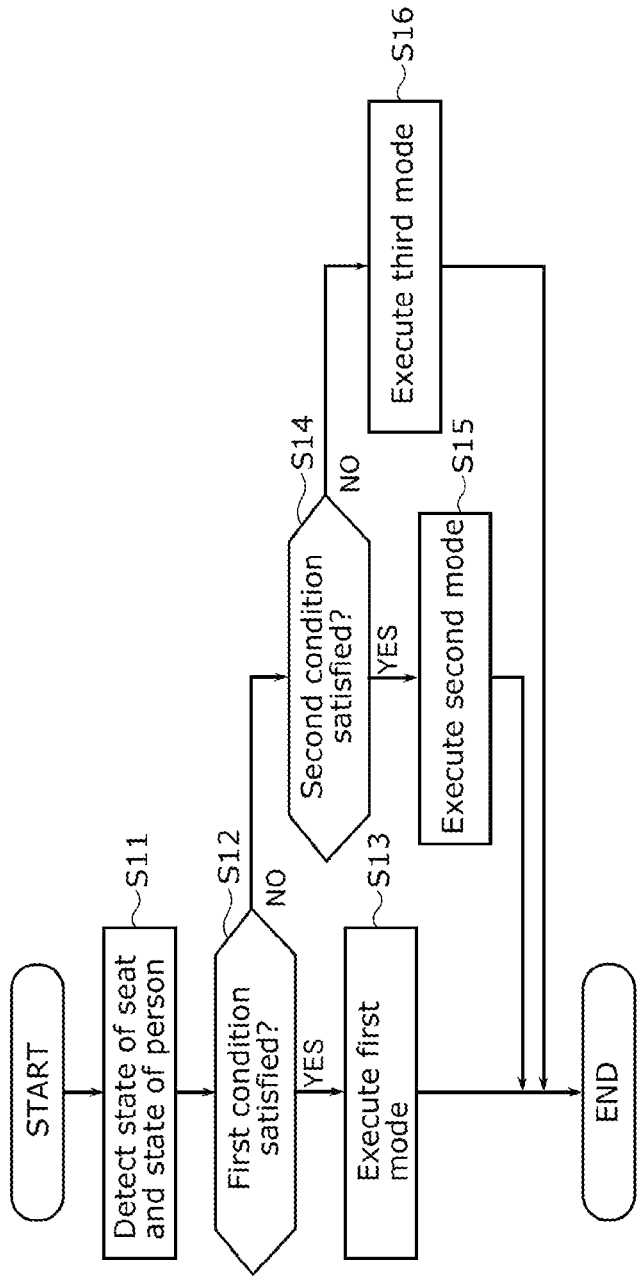
FIG. 5 is a flowchart of processing performed by the seat air-conditioning device according to Embodiment.

FIG. 5 is a flowchart of processing performed by seat air-conditioning device 3 according to Embodiment.

As illustrated in FIG. 5, sensor 50 detects the state of seat 1 and the state of the person sitting on seat 1 (S11). To be more specific, sensor 50 outputs, as the state of seat 1, the information indicating the temperature of seat 1 and the information indicating the humidity of seat 1 to controller 60. Furthermore, sensor 50 outputs, as the state of the person sitting on seat 1, the information indicating the sweating state of the person and the information indicating the sitting duration to controller 60. The following mainly describes the information indicating the temperature.

Controller 60 determines whether a first condition is satisfied, on the basis of the state of seat 1 and the state of the person sitting on seat 1 obtained as the result from sensor 50 (S12).

For example, if the temperature of seat 1 is a predetermined temperature or higher (20° C. or higher, for instance) on the basis of the information indicating the temperature of seat 1, the temperature inside seat 1 is high and thus the heat is assumed to remain in seat 1. In this case, if air is blown from second outlet 33a, warm air is blown on the head, neck, and shoulders of the person. This can cause discomfort to the person. Even if cool air is blown on the head, neck, and shoulders of the person after the surrounding temperature is stabilized, this can also cause discomfort to the person. In response to this, controller 60 determines whether the first condition is satisfied as a determination criterion. For example, the first condition is satisfied: immediately after the person sits on seat 1 (or more specifically, immediately after the person gets in the vehicle); when the person is sweating; when the person is sitting on seat 1 for a long time; or immediately after the seat heater is turned on while the air conditioner for performing air conditioning around seat 1 performs heating operation. Controller 60 receives information indicating the state immediately after the air conditioner is turned on, from air-conditioner controller 61 via communication. At this time, controller 60 may also receive information indicating whether the current operation of the air conditioner is cooling or heating. Determination is similarly made as to a second condition and a third condition as follows. Note that controller 60 may determine whether the first condition is satisfied as the determination criterion, on the basis of the information indicating the humidity. For example, if the first condition is that the humidity is a first humidity or higher (the humidity is 90% or higher), it may be determined that the first condition is satisfied as in the above case.

If determining that the first condition is satisfied (YES in S12), controller 60 switches outlet ventilation path selection switch 35 in mode by selecting the first mode and causes outlet ventilation path selection switch 35 to execute the first mode (S13).

Figure 6:
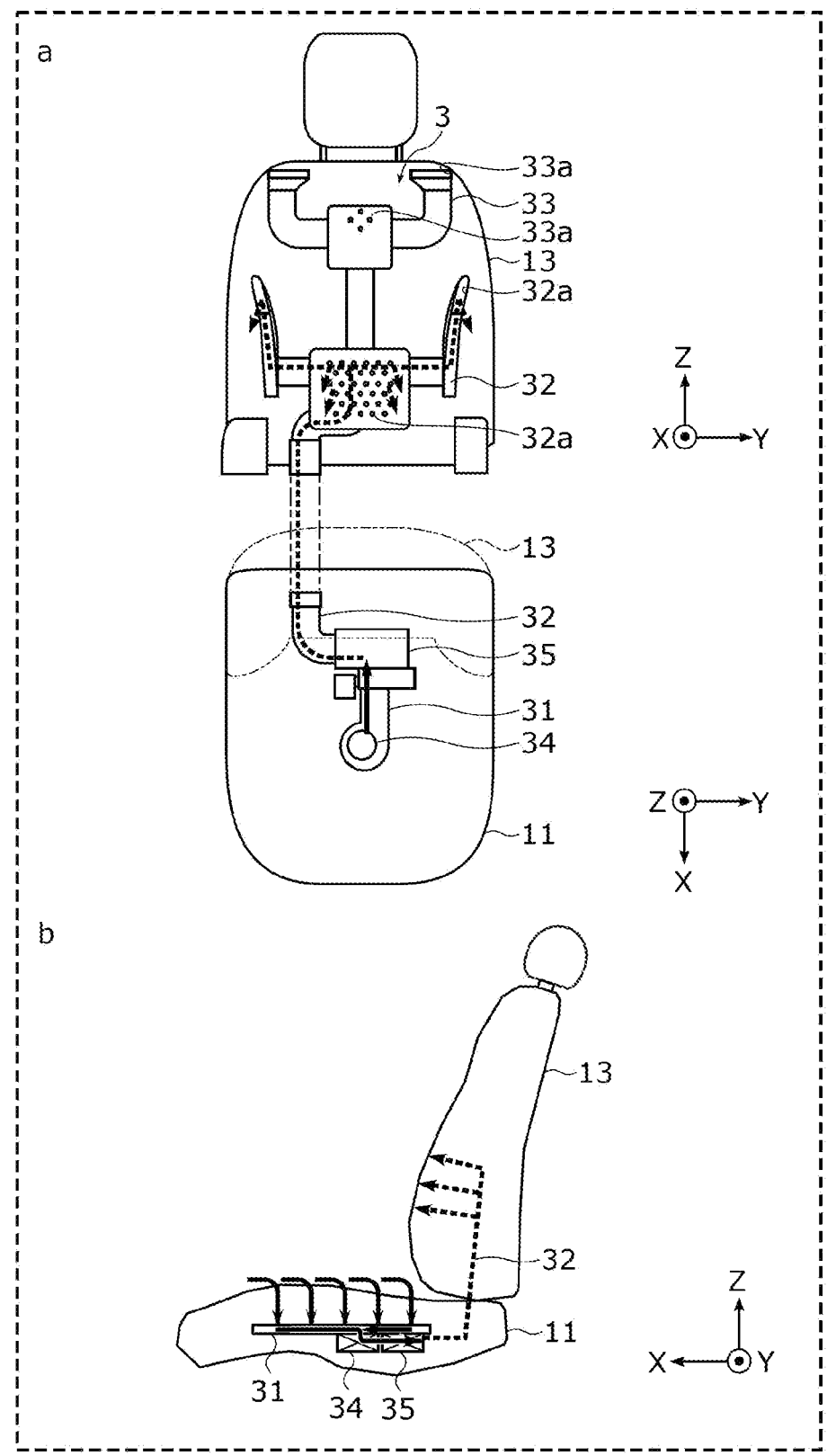
FIG. 6 is a diagram illustrating a schematic plan view of an airflow path in the seat back, a schematic top view of the airflow path in the seat base, and a schematic side view of the airflow path in the seat, in a first mode.

Here, a of FIG. 6 illustrates a schematic plan view of an airflow path in seat back 13 and a schematic top view of the airflow path in seat base 10, in the first mode. Moreover, b of FIG. 6 illustrates a schematic side view of the airflow path in seat 1 in the first mode. In the first mode executed by outlet ventilation path selection switch as illustrated in a and b of FIG. 6, air drawn in from first vent 12a of seating surface 11c of seat 1 is led to first inlet 31a from which the drawn-in air is led through first ventilation path 31. After reaching outlet ventilation path selection switch 35, the air is led through second ventilation path 32 and discharged from first outlet 32a. Then, the air passes through second vent 12b and is blown outside seat 1. With this, the warm air is not blown on the head, neck, and shoulders of the person, and the air is blown on the back and waist of the person, for example. This generates an airflow that surrounds the person from the lower part of the upper body to the buttocks and thighs. Even if the head, neck, and shoulders of the person are sweating but no cool air is discharged from first outlet 32a, heat of vaporization of sweat is expected to cool the head, neck, and shoulders of the person. Furthermore, assume that the person is sitting on seat 1 for a long time or that a seat heater, included in seat 1, is turned on while the air conditioner performs heating operation. In such a case, the first mode can prevent a body part that is in contact with seat 1 from getting sweaty. Controller 60 ends the processing. Then, controller 60 repeats the processing from Step S11.

If determining that the first condition is not satisfied (NO in S12), controller 60 determines whether the second condition is satisfied, on the basis of the state of seat 1 and the state of the person sitting on seat 1 obtained as the result from sensor 50 (S14).

For example, if the temperature of seat 1 is lower than the predetermined temperature (lower than 20° C., for instance) on the basis of the information indicating the temperature of seat 1, the temperature inside seat 1 is assumed to be low. For example, if the back and waist of the person are wet with sweat and then the air is discharged from first outlet 32a, the cool air is blown on the back and waist of the person. As a result, the back and waist of the person can be overcooled. In response to this, controller 60 determines whether the second condition is satisfied as a determination criterion. For example, the second condition is satisfied when the air conditioner that air-conditions around seat 1 lowers the temperature around seat 1 and also the back and waist of the person are wet with sweat. Note that controller 60 may determine whether the second condition is satisfied as the determination criterion, on the basis of the information indicating the humidity. For example, if the humidity is lower than the first humidity and higher than or equal to a second humidity (the humidity is lower than 90% and higher than or equal to 70%), it may be determined that the second condition is satisfied as in the above case.

If determining that the second condition is satisfied (YES in S14), controller 60 switches outlet ventilation path selection switch in mode by selecting the second mode and causes outlet ventilation path selection switch 35 to execute the second mode (S15).

Figure 7:
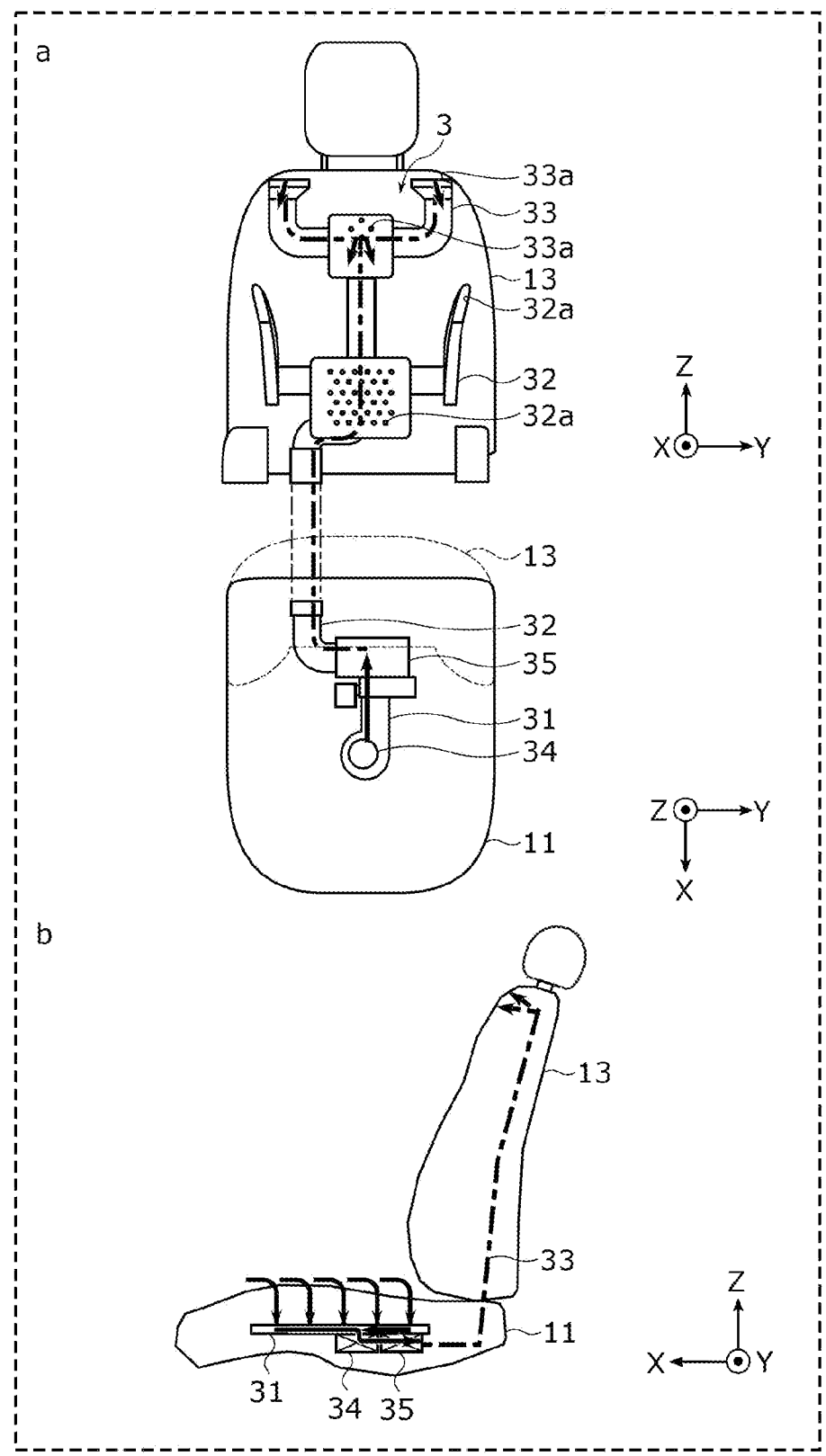
FIG. 7 is a diagram illustrating a schematic plan view of an airflow path in the seat back, a schematic top view of the airflow path in the seat base, and a schematic side view of the airflow path in the seat, in a second mode.

Here, a of FIG. 7 illustrates a schematic plan view of an airflow path in seat back 13 and a schematic top view of the airflow path in seat base 10, in the second mode. Moreover, b of FIG. 7 illustrates a schematic side view of the airflow path in seat 1 in the second mode. In the second mode executed by outlet ventilation path selection switch 35 as illustrated in a and b of FIG. 7, air drawn in from first vent 12a of seating surface 11c of seat 1 is led to first inlet 31a from which the drawn-in air is led through first ventilation path 31. After reaching outlet ventilation path selection switch 35, the air is led through third ventilation path 33 and discharged from second outlet 33a. Then, the air passes through third vent 12c and is blown outside seat 1. With this, the cool air is not blown on the back and waist of the person, and the air is blown on the head, neck, and shoulders of the person, for example. This generates an airflow that surrounds the person from the upper part of the upper body to the buttocks and thighs. Air blowing on the head, neck, and shoulders of the person is expected to act on the autonomic nervous system of the person by inhibiting sympathetic nerve activity and activating parasympathetic nerve activity. This can relax the person. Controller 60 ends the processing. Then, controller 60 repeats the processing from Step S11.

If determining that the second condition is not satisfied (NO in S14), controller 60 determines that the third condition is satisfied, on the basis of the state of seat 1 and the state of the person sitting on seat 1 obtained as the result from sensor 50.

For example, if the temperature of seat 1 is lower than the predetermined temperature (lower than 20° C., for instance) on the basis of the information indicating the temperature of seat 1, the temperature inside seat 1 is assumed to be low. For example, if the amount of solar radiation is great or if the person is sitting for a long time, the back and waist of the person is sweaty because heat builds up in the body of the person. In such a case, the person wishes to cool the whole body. Moreover, the person also wishes to reduce the energy consumption of the air conditioner. Controller 60 may determine whether the third condition is satisfied as a determination criterion. For example, the first condition and the second condition are not satisfied but the third condition is satisfied: when the temperature around seat 1 is low because of the air conditioner; when the back or the like is sweaty because heat builds up in the body of the person; or when reduction of the energy consumption of the air conditioner is desired. Note that controller 60 may determine whether the third condition is satisfied as the determination criterion, on the basis of the information indicating the humidity. For example, if the third condition is that the humidity is lower than the second humidity (the humidity is lower than 70%), it may also be determined that the third condition is satisfied.

If determining that the third condition is satisfied, controller 60 switches outlet ventilation path selection switch 35 in mode by selecting the third mode and causes outlet ventilation path selection switch 35 to execute the third mode (S16).

Figure 8:
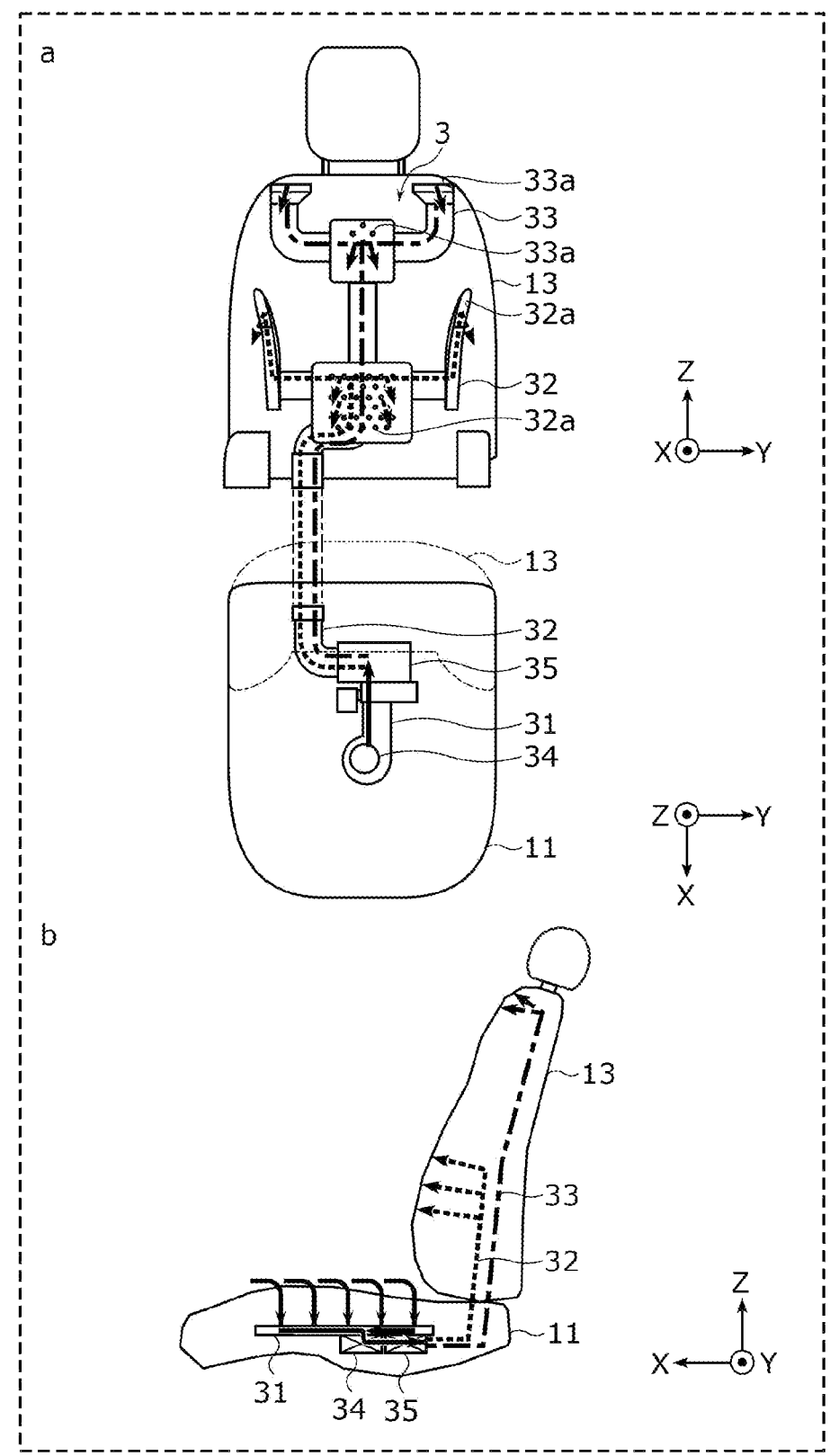
FIG. 8 is a diagram illustrating a schematic plan view of an airflow path in the seat back, a schematic top view of the airflow path in the seat base, and a schematic side view of the airflow path in the seat, in a third mode.

Here, a of FIG. 8 illustrates a schematic plan view of an airflow path in seat back 13 and a schematic top view of the airflow path in seat base 10, in the third mode. Moreover, b of FIG. 8 illustrates a schematic side view of the airflow path in seat 1 in the third mode. In the third mode executed by outlet ventilation path selection switch as illustrated in a and b of FIG. 8, air drawn in from first vent 12a of seating surface 11c of seat 1 is led to first inlet 31a from which the drawn-in air is led through first ventilation path 31. After reaching outlet ventilation path selection switch 35, the air is led through second ventilation path 32 and third ventilation path 33 and discharged from first outlet 32a and second outlet 33a. Then, the air passes through second vent 12b and third vent 12c is blown outside seat 1. With this, the air is blown on the head, neck, shoulders, back, and waist of the person, for example. This generates an airflow that surrounds the person from the whole upper body to the buttocks and thighs. Air blowing on the whole upper body of the person cools the whole body of the person, prevents the back and waist of the person from being sweaty, and reduces the energy consumption of the air conditioner. Controller 60 ends the processing. Then, controller 60 repeats the processing from Step S11.

Note that the present processing may prioritize the temperature of seat 1 over the humidity of seat 1.

In response to a change in the state of seat 1 or in the state of the person, controller 60 repeats the processing described above to freely switch the mode among the first to third modes.

The following describes a case where, when driving blower 34, controller 60 switches outlet ventilation path selection switch 35 firstly to the first mode, then to the second mode, and then to the third mode.

If determining from information received from air-conditioner controller 61 that it is immediately after the person gets in the vehicle in the summer, controller 60 determines that the first condition is satisfied and thus switches outlet ventilation path selection switch 35 to the first mode. Examples of the information received from air-conditioner controller 61 include information indicating activation of air-conditioner controller 61 and information indicating an input operation performed on an operation receiver of the air conditioner. As a result, air is first discharged from first outlet 32a toward the back and waist of the person and thus the sweating back and waist can be cooled by heat of vaporization of sweat.

Next, if determining from information received from air-conditioner controller 61 that cooling by the air conditioner has started to work, controller 60 determines that the second condition is satisfied and thus switches outlet ventilation path selection switch 35 to the second mode. Examples of the information received from air-conditioner controller 61 include information indicating a temperature around an air outlet of the air conditioner and information indicating a temperature inside the vehicle. As a result, air is first discharged from second outlet 33a toward the head, neck, and shoulders of the person. Here, as the cooling has started to work, the discharged air is also cool. The discharge of this cool air toward the head, neck, and shoulders enables effective cooling and also prevents the back and waist from being overcooled.

Next, if determining from information received from air-conditioner controller 61 that cooling effect of the air conditioner has progressed, controller 60 determines that the third condition is satisfied and thus switches outlet ventilation path selection switch 35 to the third mode. Examples of the information received from air-conditioner controller 61 also include the information indicating a temperature around the air outlet of the air conditioner and the information indicating a temperature inside the vehicle. As a result, air discharged from both first outlet 32a and second outlet 33a causes an airflow in the vehicle to surround the whole body of the person. This can provide a more comfortable air-conditioned environment to the person sitting on the seat.

Furthermore, if at least one of the temperature or the humidity is stabilized within a predetermined range by reference to at least one of the information indicating the temperature detected by temperature sensor 51 or the information indicating the humidity detected by humidity sensor 52, controller 60 may switch outlet ventilation path selection switch 35 to the first mode. To be more specific, if at least one of: that the temperature is within a predetermined range of 25° C. with plus or minus 1° C.; or that the humidity (relative humidity) is within a predetermined range of 70% with plus or minus 5%, is satisfied as the first condition, controller 60 switches outlet ventilation path selection switch 35 to the first mode. More specifically, the stability within the predetermined range indicates that the temperature detected by temperature sensor 51 is within the predetermined range with a margin of error of plus or minus a few degrees centigrade or that the humidity detected by humidity sensor 52 is within the predetermined range with a margin of error of plus or minus a few percent.

As a result, the stability of at least one of the temperature or the humidity within the predetermined range means that the cooling of the air conditioner is stabilized. At this time, switching of outlet ventilation path selection switch 35 to the first mode allows the air to be discharged toward the back and waist but not toward the head, neck, and shoulders. Thus, a comfortable air-conditioned environment can be maintained by preventing the head, neck, and shoulders from being overcooled and also keeping the airflow surrounding the back, waist, and legs.

Function Effects

Next, function effects of seat air-conditioning device 3 according to the present embodiment are described.

As described above, seat air-conditioning device 3 according to the present embodiment is used for seat 1. Seat air-conditioning device 3 includes: blower 34; first ventilation path 31 through which air is led to be drawn in by blower 34 from first inlet 31a provided in seat base 10 which is included in seat 1 and on which a person sits; second ventilation path 32 through which the air led through first ventilation path 31 by blower 34 is discharged from first outlet 32a provided in seat 1; third ventilation path 33 that is a path different from second ventilation path 32 and through which the air led through first ventilation path 31 by blower 34 is discharged from second outlet 33a provided in seat 1; and outlet ventilation path selection switch 35 that is disposed between blower 34 and first and second outlets 32a,33a and that selects at least one of second ventilation path 32 or third ventilation path 33 to which the air led through first ventilation path 31 is led. First inlet 31a, first ventilation path 31, blower 34, outlet ventilation path selection switch 35, second ventilation path 32, first outlet 32a, third ventilation path 33, and second outlet 33a are included in seat 1. First inlet 31a is provided vertically below first outlet 32a and second outlet 33a, and draws in air from seating surface 11c which is a seating side of seat base 10 and on which the person sits. First ventilation path 31 is disposed in seat base 10 and leads from first inlet 31a to outlet ventilation path selection switch 35 via blower 34.

With this, blower 34 can draw in the air from first inlet 31a provided in seat 1. More specifically, the air flowing around seat 1 by convection can be drawn in. For example, a conventional seat air-conditioning device applied to a vehicle directly supplies a seat with a part of cool or warm air that is conditioned by an air-conditioning device of the vehicle. As compared to this, the cool or warm air directly discharged from seat air-conditioning device 3 according to the present disclosure is less easily consumed by seat 1. Thus, the air inside the whole vehicle that is conditioned by the air-conditioning device is drawn in from first inlet 31a, and then the drawn-in air is discharged from at least one of first outlet 32a or second outlet 33a and blown on the person sitting on seat 1. As a result, the body of the person can be cooled or warmed.

Thus, seat air-conditioning device 3 is capable of preventing a decrease in the air-conditioning efficiency.

In particular, first inlet 31a is provided vertically below first outlet 32a and second outlet 33a. Thus, first inlet 31a can also be provided at a position corresponding to the legs of the person, and first outlet 32a and second outlet 33a can also be provided at positions corresponding to the upper body of the person, for example. In this case, an airflow can be generated near the body of the person by the air drawn in from first inlet 31a provided in seating surface 11c near the body of the person. Moreover, the drawn-in air can be discharged toward the person from at least one of first outlet 32a or second outlet 33a. As a result, an airflow surrounding the body of the person can be generated, which allows the conditioned air to stay around the person sitting on seat 1. This can provide a comfortable air-conditioned environment using a minimum air-conditioning energy. To be more specific, the air can be drawn in from first inlet 31*a* provided in seating surface 11*c* of seat 1, which can prevent the buttocks and thighs in contact with seating surface 11*c* from getting sweaty. Furthermore, first outlet 32*a* and second outlet 33*a* are provided vertically above first inlet 31*a*, which allows the air to be blown on the upper body of the person. More specifically, the airflow toward the upper body and the buttocks and thighs can be generated. This allows the conditioned air to stay around the person sitting on seat 1, and can also provide a more comfortable air-conditioned environment using a minimum air-conditioning energy.

Assume that the person who is sweating gets in the vehicle in the summer. In this case, the air is not discharged toward the buttocks in particular because first inlet 31*a* is vertically below first outlet 32*a* and second outlet 33*a*. This results in a reduction of discomfort caused by having the sweaty buttocks unnecessarily cooled.

Moreover, the conventional vehicle seat air-conditioning device draws in the air discharged from the in-vehicle air-conditioning unit. However, immediately after the person gets in the vehicle in the summer, the in-vehicle air-conditioning unit is not fully running yet. Thus, warm air is drawn in before cool air is discharged. In other words, the warm air is discharged toward the person. This can cause discomfort to the person. In contrast, seat air-conditioning device 3 according to an aspect of the present disclosure does not directly draw in the air discharged from the air conditioner. Thus, the discomfort of the person caused by the discharged warm air can be reduced.

Furthermore, seat 1 includes first inlet 31*a*, first ventilation path 31, blower 34, outlet ventilation path selection switch 35, second ventilation path 32, first outlet 32*a*, third ventilation path 33, and second outlet 33*a* that are included in seat air-conditioning device 3. This simplifies the configuration.

Furthermore, seat air-conditioning device 3 according to the present embodiment includes first outlet 32*a* that is provided vertically below second outlet 33*a*.

Thus, first outlet 32*a* and second outlet 33*a* may be provided at positions corresponding to the upper body of the person, for example. In this case, first outlet 32*a* allows the air to be blown on the lower part of the upper body of the person, and second outlet 33*a* allows the air to be blown on the upper part of the upper body of the person. In this way, the air can be blown on a predetermined part of the body of the person, and the body can be thereby partly cooled or warmed. This allows the conditioned air to stay around the person sitting on seat 1, and can also provide a more comfortable air-conditioned environment using a minimum air-conditioning energy.

Furthermore, seat air-conditioning device 3 according to the present embodiment includes outlet ventilation path selection switch that has the first mode in which the air led through first ventilation path 31 is led through only second ventilation path 32 to be discharged from first outlet 32*a*.

With this, the air can be blown on the lower part of the upper body, such as the buttocks and waist of the person. In other words, the air can be prevented from being blown on the upper part of the upper body, such as the head and neck of the person. The air discharged from first outlet 32*a* and blown on the lower part of the upper body of the person is drawn in from first inlet 31*a* of seating surface 11*c*. To be more specific, the air from first outlet 32*a* is drawn in from first inlet 31*a* via the lower part of the upper body of the person sitting on seat 1. This can generate the airflow that surrounds the person from the lower part of the upper body to the buttocks and thighs.

As a specific example, assume that the person is sitting on seat 1 for a long time or that a seat heater is turned on while the air conditioner for air-conditioning around seat 1 performs heating operation. In such a case, the first mode can prevent a body part in contact with seat 1 from getting sweaty. As another example, assume that the person sits on seat 1 when seat 1 is warm or that the air conditioner is turned on when the person is sweating. Immediately after such a case, the first mode, in which no air is discharged from second outlet 33*a*, can also prevent the discomfort of overcooling, by blowing no air on the warm head and neck of the person. This allows the conditioned air to stay around the person sitting on seat 1, and can also provide a more comfortable air-conditioned environment using a minimum air-conditioning energy.

Furthermore, seat air-conditioning device 3 according to the present embodiment includes the outlet ventilation path selection switch 35 that has the second mode in which the air led through first ventilation path 31 is led through only third ventilation path 33 to be discharged from second outlet 33*a*.

With this, the air can be blown on the upper part of the upper body, such as the head and neck of the person. In other words, the air can be prevented from being blown on the lower part of the upper body, such as the buttocks and waist of the person. The air discharged from second outlet 33*a* and blown on the upper part of the upper body of the person is drawn in from first inlet 31*a* of seating surface 11*c*. To be more specific, the air from second outlet 33*a* is drawn in from first inlet 31*a* via the upper part of the upper body of the person sitting on seat 1. This can generate the airflow that surrounds the person from the upper part of the upper body to the buttocks and thighs.

As a specific example, although the heat remaining in seat 1 decreases as the temperature around seat 1 is lowered by the air conditioner, the back and waist of the person may be still wet with sweat. In this case, the second mode can cool the shoulders, neck, and head without overcooling the back and waist of the person. This allows the conditioned air to stay around the person sitting on seat 1, and can also provide a more comfortable air-conditioned environment using a minimum air-conditioning energy.

Furthermore, seat air-conditioning device 3 according to the present embodiment includes outlet ventilation path selection switch that has the third mode in which the air led through first ventilation path 31 is led simultaneously through both second ventilation path 32 and third ventilation path 33 to be discharged simultaneously from both first outlet 32*a* and second outlet 33*a*.

With this, the air discharged from first outlet 32*a* and second outlet 33*a* and blown on the person is drawn in from first inlet 31*a* of seating surface 11*c*. More specifically, the air discharged from first outlet 32*a* and second outlet 33*a* is drawn in from first inlet 31*a* via the person sitting on seat 1. This can generate the airflow that surrounds substantially the whole body of the person from the whole upper body to the buttocks and thighs.

As a specific example, although the heat remaining in seat 1 is removed as the temperature around seat 1 is lowered by the air conditioner, heat builds up in the body of the person when the amount of solar radiation is great or when the person is sitting for a long time. In this case, the third mode can cool the whole body of the person. Moreover, if the person wishes to reduce the energy consumption of the air conditioner, the third mode can cool the whole body. This allows the conditioned air to stay around the person sitting on seat 1, and can also provide a more comfortable air-conditioned environment. Furthermore, the energy consumption of the system including the air conditioner can be reduced.

Furthermore, seat air-conditioning device 3 according to the present embodiment includes a controller that controls blower 34 and outlet ventilation path selection switch 35. Outlet ventilation path selection switch 35 has: the first mode in which the air led through first ventilation path 31 is led through only second ventilation path 32 to be discharged from first outlet 32*a*; the second mode in which the air led through first ventilation path 31 is led through only third ventilation path 33 to be discharged from second outlet 33*a*; and the third mode in which the air led through first ventilation path 31 is led simultaneously through both second ventilation path 32 and third ventilation path 33 to be discharged simultaneously from both first outlet 32*a* and second outlet 33*a*. Controller 60 switches outlet ventilation path selection switch 35 in mode, by selecting one of the first mode, the second mode, and the third mode.

With this, controller 60 can select one of the first mode, the second mode, and the third mode. This appropriately enables cooling or heating depending on the state or request of the person.

Furthermore, seat air-conditioning device 3 according to the present embodiment includes at least one of temperature sensor 51 or humidity sensor 52. Controller 60 switches outlet ventilation path selection switch 35 in mode, based on information indicating a temperature detected by temperature sensor 51 and information indicating a humidity detected by humidity sensor 52.

With this, the temperature and the humidity near the seat can be detected. Thus, the ventilation path selection switch can be switched in mode to generate the airflow that makes the person feel comfortable. Furthermore, the result of the detection of the temperature and the humidity can be outputted to the air conditioner, for example. This allows the air conditioner to perform air-conditioning based on the result of the detection of the temperature and the humidity.

Furthermore, seat air-conditioning device 3 according to the present embodiment includes at least one of temperature sensor 51 or humidity sensor 52 that is provided in one of first ventilation path 31 and outlet ventilation path selection switch 35.

With this, the temperature and the humidity of the surface of seat 1, or more specifically, the temperature equivalent to that of the buttocks and thighs of the person sitting on seat 1 and the humidity equivalent to that between seating surface 11*c* and the buttocks and thighs can be accurately detected. Thus, outlet ventilation path selection switch 35 can be switched in mode to generate the airflow that makes the person feel more comfortable.

Furthermore, seat air-conditioning device 3 according to the present embodiment includes: first outlet 32*a* that is provided at a position corresponding to at least one of the back or the waist of the person; and second outlet 33*a* that is provided at a position corresponding to at least one of the head, the neck, and the shoulders of the person.

With this, the air discharged from first outlet 32*a* is blown on at least one of the back or the waist of the person, and the air discharged from second outlet 33*a* is blown on at least one of the head, the neck, or the shoulders of the person. As a result, a part of the body of the person can be cooled or warmed, and thus substantially the whole body of the person can be cooled or warmed. This allows the conditioned air to stay around the person sitting on seat 1, and can also provide a more comfortable air-conditioned environment using a minimum air-conditioning energy.

Furthermore, seat air-conditioning device 3 according to the present embodiment includes controller 60 that, when driving blower 34, switches outlet ventilation path selection switch 35 firstly to the first mode, then to the second mode, and then to the third mode.

With this, during a period, especially in the summer, from immediately after the person gets in the vehicle until when cooling by the air conditioner starts to work, the seat air-conditioning is executed in the mode adapting to the ever-changing in-vehicle environment. This allows the conditioned air to stay around the person sitting on seat 1, and can also provide a more comfortable air-conditioned environment using a minimum air-conditioning energy.

Furthermore, seat air-conditioning device 3 according to the present embodiment includes controller 60 that switches outlet ventilation path selection switch 35 to the first mode if at least one of the temperature or the humidity is stabilized within a predetermined range by reference to at least one of the information indicating the temperature detected by temperature sensor 51 or the information indicating the humidity detected by humidity sensor 52.

With this, when cooling by the air conditioner is stabilized, the air is discharged toward the back and waist and is not discharged toward the head, neck, and shoulders. This prevents the head, neck, and shoulders from being overcooled, and also keeps the airflow surrounding the back, waist, and legs. As a result, a comfortable air-conditioned environment can be maintained.

Variation 1 of Embodiment

The present variation is different from Embodiment describing seat air-conditioning device 3 in that first ventilation path 131 also communicates with second inlet 31*b*. The other components according to the present variation are the same as those according to Embodiment unless otherwise specified. The same components and functions are assigned the same reference signs as those used in Embodiment and detailed descriptions on these components and functions are omitted here.

Figure 9:
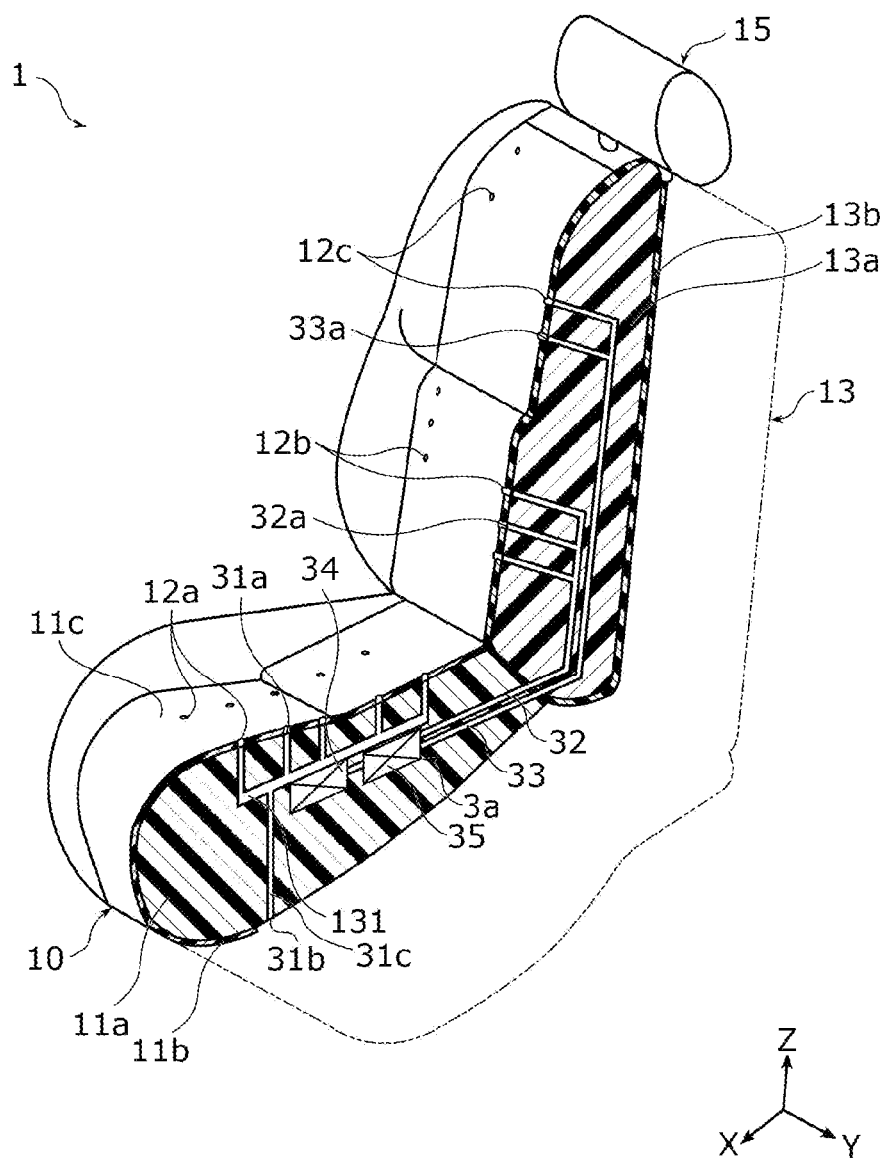
FIG. 9 is a diagram illustrating an external perspective view of a seat provided with a seat air-conditioning device according to Variation 1 of Embodiment, together with a cross-sectional view of the seat.

FIG. 9 is a diagram illustrating an external perspective view of seat 1 provided with seat air-conditioning device 3*a* according to the variation of Embodiment, together with a cross-sectional view of seat 1.

As illustrated in FIG. 9, first ventilation path 131 communicates with second inlet 31*b* that is different from first inlet 31*a*. More specifically, first ventilation path 131 has communication hole 31*c* forming second inlet 31*b*. In the present embodiment, communication hole 31*c* extends from second inlet 31*b* in the Z-axis direction and is connected to first ventilation path 131. Second inlet 31*b* is provided in a surface other than seating surface 11*c* of seat 1. In the present embodiment, second inlet 31*b* is provided in the surface opposite to seating surface 11*c* (that is, provided in the surface of seat base 10 on the negative side in the Z-axis direction). Thus, second inlet 31*b* is capable of drawing in air around the bottom of seat 1. The air drawn in from first inlet 31*a* and the air drawn in from second inlet 31*b* are mixed while traveling the path from first inlet 31*a* and second inlet 31*b* to outlet ventilation path selection switch 35. Then, the air is led to at least one of second ventilation path 32 or third ventilation path 33.

Second inlet 31*b* may be provided opposite to the air outlet of the air conditioner included in the vehicle. More specifically, cool or warm air discharged from the air conditioner and drawn in from second inlet 31b may be mixed with the air flowing through first ventilation path 131.

As described, seat air-conditioning device 3a according to the present variation includes first ventilation path 131 that communicates with second inlet 31b different from first inlet 31a. Second inlet 31b is provided in the surface other than seating surface 11c of seat 1.

With this, first ventilation path 131 communicates not only with first inlet 31a, but also with second inlet 31b. Thus, the air drawn in from first inlet 31a between seating surface 11c and the person can be mixed with the air drawn in from second inlet 31b provided in a position other than seating surface 11c (the air around the bottom of seat 1 in this case). In this way, the air around seat 1 is actively taken in, which provides a more comfortable air-conditioned environment to the person sitting on seat 1.

The present variation achieves the same function effects as those described above.

Variation 2 of Embodiment

The present variation is different from Embodiment describing seat air-conditioning device 3 in that first inlets 31a are provided in the center portion and the outer edge portion of seating surface 11c. In particular, first inlets 31a are provided in the outer edge portion, or more specifically, in rear portion 11d, front edge portion 11e, and both side portions 11f of seating surface 11c. The other components according to the present variation are the same as those according to Embodiment unless otherwise specified. The same components and functions are assigned the same reference signs as those used in Embodiment and detailed descriptions on these components and functions are omitted here.

Figure 10:
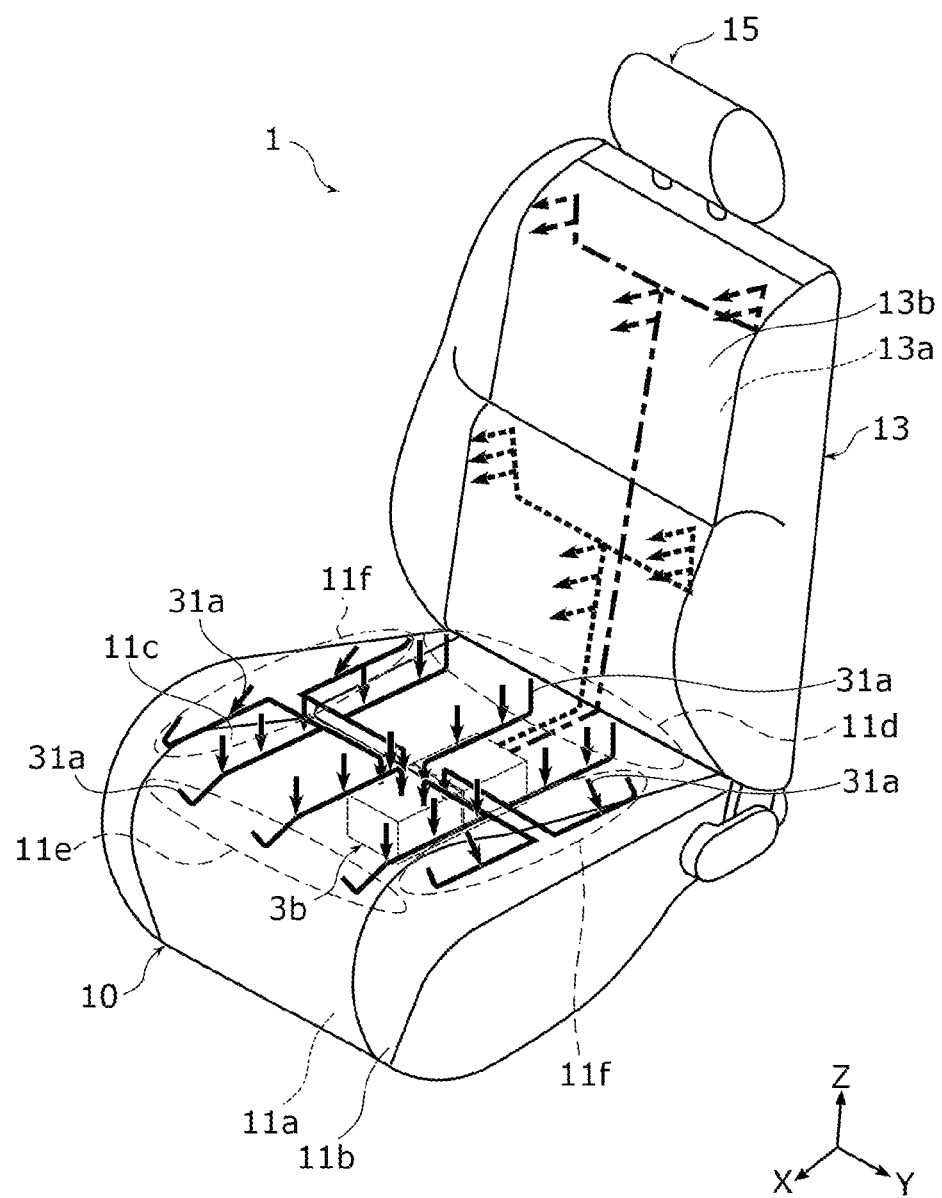
FIG. 10 is an external perspective view of a seat provided with a seat air-conditioning device according to Variation 2 of Embodiment.

FIG. 10 is an external perspective view of seat 1 provided with seat air-conditioning device 3b according to Variation 2 of Embodiment.

As illustrated in FIG. 10, first inlets 31a are provided in the center portion and the outer edge portion of seating surface 11c. Here, the outer edge portion includes rear portion 11d, front edge portion 11e, and both side portions 11f of seating surface 11c. Note that although rear portion 11d, front edge portion 11e, and both side portions 11f are described as representing all portions of the outer edge portion, the outer edge portion may only include at least one of rear portion 11d or front edge portion 11e. Thus, first inlets 31a provided on both the center portion and the outer edge portion lead the air to first ventilation path 31.

With this, between seating surface 11c and the buttocks and thighs, the air drawn in from first inlet 31a provided in the center portion of seating surface 11c can prevent the buttocks and thighs of the person from being sweaty. Furthermore, among first inlets 31a provided in the outer edge portion (rear portion 11d, front edge portion 11e, and both side portions 11f) of seating surface 11c, first inlets 31a provided in rear portion 11d and front edge portion 11e of seating surface 11c in particular are even less likely to be covered by the buttocks and thighs of the person and thus can draw in the air around seat 1. For example, if first inlet 31a provided in the center portion of seating surface 11c is unable to draw in the air, first inlet 31a provided in the outer edge portion of seating surface 11c is able to draw in the air. Thus, the air can be discharged from first outlet 32a and second outlet 33a.

Variation 3 of Embodiment

The present variation is different from Embodiment describing seat air-conditioning device 3 in that seat air-conditioning device 3c further includes: second inlet 31b provided at a position different from the position of first inlet 31a; fourth ventilation path 31c1 that is connected to second inlet 31b; and inlet ventilation path selection switch 36 connected to first ventilation path 31 and fourth ventilation path 31c1. The other components according to the present variation are the same as those according to Embodiment unless otherwise specified. The same components and functions are assigned the same reference signs as those used in Embodiment and detailed descriptions on these components and functions are omitted here.

Figure 11:
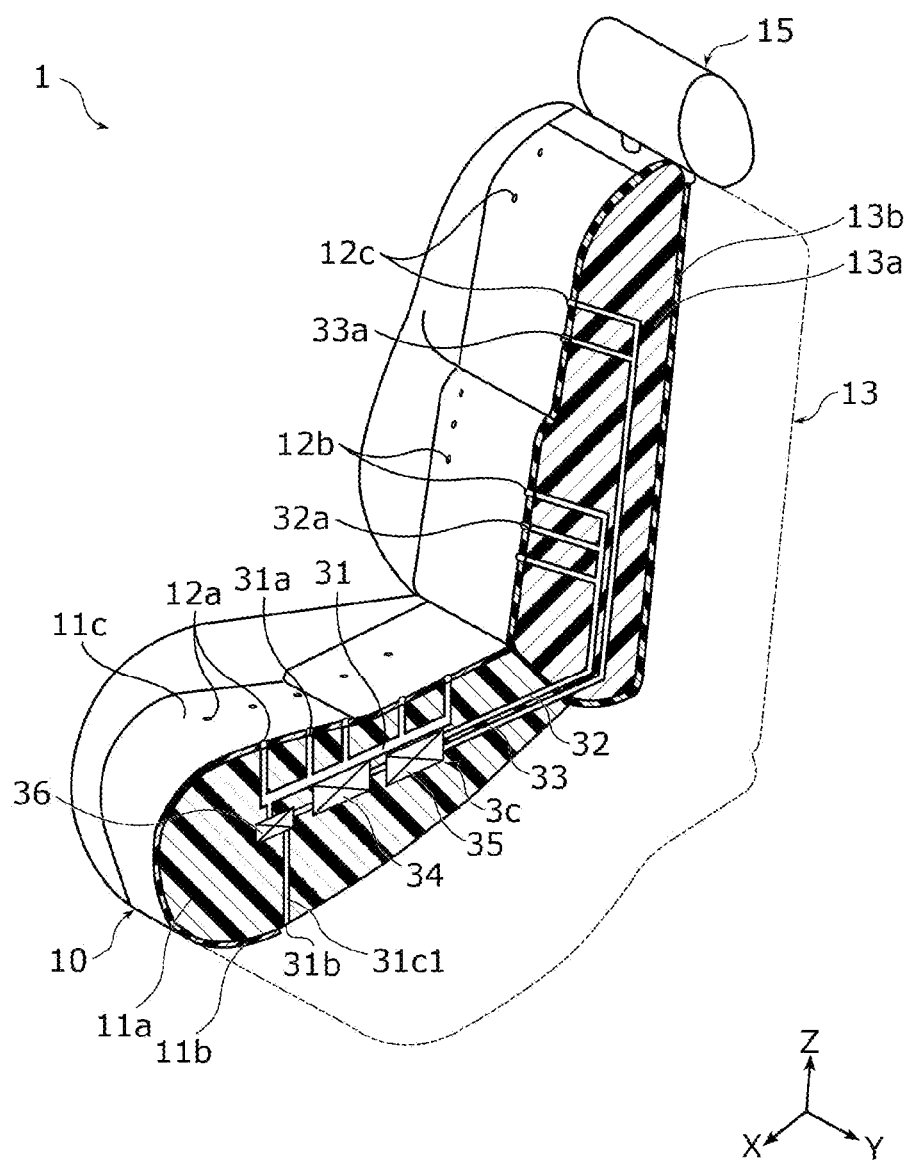
FIG. 11 is a diagram illustrating an external perspective view of a seat provided with a seat air-conditioning device according to Variation 3 of Embodiment, together with a cross-sectional view of the seat.

FIG. 11 is a diagram illustrating an external perspective view of seat 1 provided with seat air-conditioning device 3c according to Variation 3 of Embodiment, together with a cross-sectional view of seat 1.

As illustrated in FIG. 11, second inlet 31b is provided at the position different from the position of first inlet 31a. As in FIG. 9, second inlet 31b according to the present variation is provided on the surface of seat base 10 on the negative side in the Z-axis direction and thus capable of drawing in air around the bottom of seat 1. Note that the position of second inlet 31b is not limited to the position illustrated in FIG. 11 and that second inlet 31b may be provided in a side surface or a back surface of seat back 13, for example. Furthermore, second inlet 31b may be connected to an air-conditioning device (not shown) included in the vehicle. Second inlet 31b is connected to fourth ventilation path 31c1. Fourth ventilation path 31c1 is connected to inlet ventilation path selection switch 36. Similarly, first ventilation path 31 connected to first inlet 31a is also connected to inlet ventilation path selection switch 36.

Inlet ventilation path selection switch 36 has a function of selecting at least one of first ventilation path 31 or fourth ventilation path 31c1. Inlet ventilation path selection switch 36 is connected to blower 34, and thus the air from the selected ventilation path is drawn by blower 34. Inlet ventilation path selection switch 36 is electrically connected to controller 60 and thereby capable of selecting at least one of first ventilation path 31 or fourth ventilation path 31c1 under the control of controller 60.

To achieve this configuration, blower 34 is connected between inlet ventilation path selection switch 36 and outlet ventilation path selection switch 35.

Here, selection modes of inlet ventilation path selection switch 36 are defined as follows. First, a mode of connecting first ventilation path 31 to blower 34 is defined as a fourth mode. Next, a mode of connecting fourth ventilation path 31c1 to blower 34 is defined as a fifth mode. Next, a mode of connecting both first ventilation path 31 and fourth ventilation path 31c1 to blower 34 is defined as a sixth mode. Thus, controller 60 switches inlet ventilation path selection switch 36 in mode by selecting one of the fourth mode, the fifth mode, and the sixth mode. With this configuration, controller 60 performs control to cause air to be drawn in from at least one of first inlet 31a or second inlet 31b and cause air to be discharged from at least one of first outlet 32a or second outlet 33a.

Next, an operation of seat air-conditioning device 3c according to the present variation is described. As described in Embodiment, controller 60 usually controls one of the first to third modes, on the basis of the output from temperature sensor 51 or humidity sensor 52, for example. At the same time, controller 60 controls one of the fourth to sixth modes. For example, if the output from temperature sensor 51 or humidity sensor 52 exceeds a predetermined threshold value, the control is performed to cause inlet ventilation path selection switch 36 to be switched to the fifth mode so that the temperature-controlled air from the air conditioner is actively taken in. Then, if the output from temperature sensor 51 or humidity sensor 52 is likely to fall below the predetermined threshold value, the control is performed to cause inlet ventilation path selection switch 36 to be switched to the sixth mode so that air around seat base 11c is taken in to generate an airflow surrounding the person. Following this, if the output from temperature sensor 51 or humidity sensor 52 falls below the predetermined threshold value and is then stabilized, the control is performed to cause inlet ventilation path selection switch 36 to be switched to the fourth mode so that only the airflow surrounding the person is generated. Then, in response to a change in the output from temperature sensor 51 or from humidity sensor 52, controller 60 may compare the output with the predetermined threshold value and then perform control to switch inlet ventilation path selection switch 36 to the most suitable mode as described above.

This enables selection between, or mixture of, the air drawn in from first inlet 31a provided between seating surface 11c and the person and the air drawn in from second inlet 31b provided in a position other than seating surface 11c. If the temperature of the air drawn in from second inlet 31b is different from the temperature of the air drawn in from first inlet 31a, the temperature can be adjusted more finely through the air selection or the air mixture. This can provide a more comfortable air-conditioned environment to the person sitting on seat 1.

Next, an operation performed when the person gets in the vehicle in the middle of summer is described as an example. For example, if determining that the vehicle that has not been used is unlocked and also that the in-vehicle temperature received from the air conditioner is higher than or equal to a threshold value (30° C. as an example), controller 60 performs the following operation.

First, controller 60 performs operation (1) of switching inlet ventilation path selection switch 36 to the fourth mode (in which the air is drawn in only from seating surface 11c) and switching ventilation path selection switch 35 to the first mode (in which the air is discharged only toward the waist and back). With operation (1), even if cool air is unavailable from the air conditioner because it is immediately after the startup of the vehicle, air is blown only on the waist and back of the person so that heat of vaporization of sweat causes cool feeling. At this time, no air is blown on the neck and shoulders to keep the neck and shoulders out of lukewarm air.

Next, controller 60 performs operation (2) of switching inlet ventilation path selection switch 36 to the fifth mode (in which the air is drawn in from a position other than seating surface 11c) and switching ventilation path selection switch 35 to the second mode (in which the air is discharged only toward the neck and shoulders). With operation (2), cool air is actively taken in from second inlet 31b as the cool air starts blowing from the air conditioner, and the air stops blowing on the waist and back wet with sweat (to prevent overcooling) and starts blowing on the neck and shoulders to cool the neck and shoulders.

Next, controller 60 performs operation (3) of switching inlet ventilation path selection switch 36 to the sixth mode (in which the air is drawn in from both seating surface 11c and a position other than seating surface 11c) and keeping ventilation path selection switch 35 in the second mode (in which the air is discharged only toward the neck and shoulders). With operation (3), the air is drawn in also from the first inlet of seating surface 11c and thereby starts generating the airflow that surrounds the person to increase the comfort.

Next, controller 60 performs operation (4) of switching inlet ventilation path selection switch 36 to the fourth mode (in which the air is drawn in only from seating surface 11c) and keeping ventilation path selection switch 35 in the second mode (in which the air is discharged only toward the neck and shoulders). With operation (4), only the airflow surrounding the person is generated and the taking in of the cool air from the air conditioner is stopped to prevent overcooling.

Next, controller 60 performs operation (5) of switching inlet ventilation path selection switch 36 to the third mode (in which the air is discharged toward both the waist and back and the neck and shoulders) and keeping ventilation path selection switch 35 in the fourth mode (in which the air is drawn in only from seating surface 11c). With operation (5), the air is blown not only on the neck and shoulders but also on the waist and back to prevent the heat from building up in the waist and back due to a long drive.

Note that controller 60 switches among operations (1) to (5), on the basis of an elapsed time after the person gets in the vehicle and the output from temperature sensor 51 or humidity sensor 52.

This operation procedure included in the control performed by controller 60 can increase the comfort in the vehicle especially in the middle of summer.

Variation 4 of Embodiment

The present variation is different from Variation 3 describing seat air-conditioning device 3c, in the following respect. If inlet ventilation path selection switch 36 is continuously kept in the fourth mode or the sixth mode for a first predetermined period, controller 60 switches inlet ventilation path selection switch 36 to the fifth mode and also alternates outlet ventilation path selection switch 35 between the first mode and the second mode, for a second predetermined period. The other components according to the present variation are the same as those according to Variation 3 unless otherwise specified. The same components and functions are assigned the same reference signs as those used in Variation 3 and detailed descriptions on these components and functions are omitted here.

Figure 12:
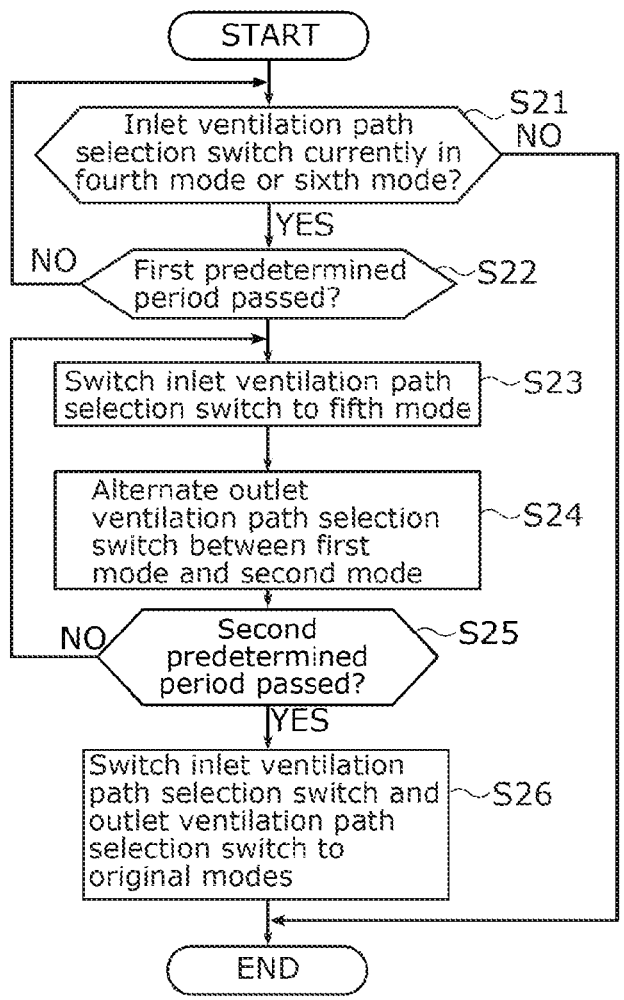
FIG. 12 is a flowchart of processing performed by a seat air-conditioning device according to Variation 4 of Embodiment.

FIG. 12 is a flowchart of processing performed by seat air-conditioning device 3c according to Variation 4 of Embodiment.

The configuration of seat air-conditioning device 3c according to the present variation is the same as the configuration described in Variation 3 with reference to FIG. 11. Thus, the following describes an operation that characterizes the present variation, with reference to FIG. 12.

Controller 60 repeats the operation illustrated by the flowchart in FIG. 12 while the vehicle is used. When the flowchart of FIG. 12 is started, controller 60 determines whether the current mode of inlet ventilation path selection switch 36 is the fourth mode (in which the air is drawn in from only seating surface 11c) or the sixth mode (in which the air is drawn in from both seating surface 11c and a position other than seating surface 11c) (Step S21). Assume that the current mode is neither of these two, or more specifically, assume that the current mode is the fifth mode (in which the air is drawn in from a position other than seating surface 11c) (NO in S21). In this case, the inside of the vehicle is assumed to be hot because it is immediately after the startup of the vehicle and thus the cool air is actively discharged from the air conditioner. From this, it is determined that attention of the driver is maintained. Thus, controller 60 ends the flowchart of FIG. 12.

In contrast, if the current mode is the fourth mode or the sixth mode (YES in S21), controller 60 determines whether the first predetermined period has passed since the start of the flowchart of FIG. 12 (Step S22). Note that the first predetermined period is, for example, 30 minutes as a length of time before the tension of the driver breaks because of the continued comfort surrounding the person in the fourth mode or the sixth mode. If the first predetermined period has not passed (NO in S22), controller 60 returns to Step S21 and repeats the operation from Step S21.

In contrast, if the first predetermined period has passed (YES in S22), it is assumed that the tension of the driver breaks. In response to this, controller 60 executes the following operation to issue a caution to the driver.

First, controller 60 switches inlet ventilation path selection switch 36 to the fifth mode (in which the air is drawn in from a position other than seating surface 11c) (Step S23). As a result, the comfortable airflow surrounding the person is suspended. Next, controller 60 alternates outlet ventilation path selection switch 35 between the first mode (in which the air is discharged toward the waist and back) and the second mode (in which the air is discharged toward the neck and shoulders) (Step S24). Here, these modes alternate every 30 seconds, at which time the driver can be assumed to be cautioned. As a result of this operation, the comfortable airflow toward the driver is suspended and also the air blowing on the waist and back alternates with the air blowing on the neck and shoulders. This causes uncomfortable feeling about the air conditioning. In this way, the caution can be issued against the break of the tension.

Next, controller 60 determines whether the second predetermined period has passed since the start of the operation of Step S23 (Step S25). Here, the second predetermined period is, for example, five minutes, at which time the caution to the driver can be assumed to be issued by causing the uncomfortable feeling described above. If the second predetermined period has not passed (NO in S25), controller 60 returns to Step S23 and repeats the operation from Step S23.

In contrast, if the second predetermined period has passed (YES in S25), it is assumed that the issue of the caution to the driver has completed. Thus, controller 60 switches inlet ventilation path selection switch 36 and outlet ventilation path selection switch 35 to the modes (the original modes) used immediately before the flowchart of FIG. 12 is executed (Step S26). Then, the flowchart of FIG. 12 is ended.

With this, generation of the airflow surrounding the person continues. Especially when the tension of the driver reduces, the air of the air conditioner that is different in temperature from the seating surface (first inlet 31a) is drawn in only from second inlet 31b and the air is blown alternately on the waist and back and on the neck and shoulders. With this, the driver can be cautioned.

Other Variations Etc.

Although the present disclosure has been described based on the above embodiments and variations, the present disclosure is not limited to the embodiments and variations.

For example, seat 1 of seat air-conditioning device 3 according to each of Embodiment and Variations of Embodiment described above may include a seat heater. The seat heater is provided in at least one of seat base 10 or seat back 13 of seat 1 included in the vehicle for instance. The seat heater produces heat to warm the back, waist, buttocks, and thighs of the person. The seat heater heats seat 1 in heating setting and does not heat seat 1 in non-heating setting. The seat heater may be interposed between first seat pad 11a and seat cover 11b and between second seat pad 13a and second seat cover 13b. The seat heater may include a base material and a heater line. The base material may be a sheet-like non-woven fabric made of an elastic, flexible, and ductile material, or may be a cloth-like foamable resin, such as urethane. The heater line may be a conductive line that is electrically connected to controller 60, which controls power supplied to the heater line, and that produces heat by the power from power source 70 under the control of controller 60. Controller 60 may be able to control the amount of heat produced by the heater line by turning on and off the current applied to the heater line or by changing a current value.

Furthermore, the controller included in the seat air-conditioning device according to each of Embodiment and Variations of Embodiment may switch the outlet ventilation path selection switch in mode by automatically selecting one of the first mode, the second mode, and the third mode. Alternatively, the controller may switch the outlet ventilation path selection switch in mode by a manual operation performed by the person.

Furthermore, the controller included in the seat air-conditioning device according to each of Embodiment and Variations of Embodiment may obtain information indicating a temperature inside the vehicle and information indicating a humidity inside the vehicle from, for example, a temperature sensor and a humidity sensor included in the vehicle. On the basis of these pieces of information together with the information indicating a temperature inside the vehicle and the information indicating a humidity inside the vehicle received from the temperature sensor and the humidity sensor of the seat air-conditioning device, the controller may automatically select one of the first mode, the second mode, and the third mode.

Each of the processing units included in the seat air-conditioning device according to the above-described embodiments and variations may be implemented to a Large Scale Integration (LSI) circuit that is typically an integrated circuit. These integrated circuits may be formed as separate chips, or may be formed as one chip so as to include the entire processing units or part of the processing units.

Moreover, the circuit integration technique is not limited to LSI, and may be realized by a dedicated circuit or a general purpose processor. After manufacturing of the LSI circuit, a field programmable gate array (FPGA) or a reconfigurable processor which is reconfigurable in connection or settings of circuit cells inside the LSI circuit may be used.

It should be noted that, in the above-described embodiments and variations, each of the constituent elements may be implemented into a dedicated hardware or implemented by executing a software program suitable for the constituent element. Each of the constituent elements may be implemented when a program executing unit, such a central processing unit (CPU) or a processor, reads a software program from a recording medium, such as a hard disk or a semiconductor memory, and executes the readout software program.

Furthermore, all the numerical values indicated in the above are examples for explaining the present disclosure in detail, and do not limit the embodiments and variations of the present disclosure.

The dividing of the functional blocks in each of the block diagrams is one example. It is possible that a plurality of functional blocks are implemented into a single functional block, that a single functional block is divided into a plurality of functional blocks, and that a function executed by a functional block is partially executed by another functional block. Furthermore, similar functions of a plurality of functional blocks may be executed by a single hardware or software in parallel or by time division.

An order of performing the steps in each of the flowcharts is an example for explaining the present disclosure in detail. The steps may be performed in different orders. Different steps among the steps may be performed simultaneously, in other words, in parallel.

In addition, the present disclosure may include embodiments obtained by making various modifications on the above embodiments and variations which those skilled in the art will arrive at, or embodiments obtained by selectively combining the elements and functions disclosed in the above embodiments and variations, without materially departing from the scope of the present disclosure.

Further Information about Technical Background to this Application

The disclosures of the following patent applications including specification, drawings, and claims are incorporated herein by reference in their entirety: Japanese Patent Application No. 2020-182145 filed on Oct. 30, 2020, Japanese Patent Application No. 2021-096796 filed on Jun. 9, 2021, and PCT International Application No. PCT/JP2021/035222 filed on Sep. 27, 2021.

INDUSTRIAL APPLICABILITY

The present disclosure is applicable to a mobile seat or a sofa of a vehicle, for example.

The invention claimed is:

1. A seat air-conditioning device for use in a seat, the seat air-conditioning device comprising:
   a blower;
   a first ventilation path through which air is led to be drawn in from a first inlet by the blower, the first inlet being provided in a seat base which is included in the seat and on which a person sits;
   a second ventilation path through which the air led through the first ventilation path by the blower is discharged from a first outlet provided in the seat;
   a third ventilation path that is different from the second ventilation path and through which the air led through the first ventilation path by the blower is discharged from a second outlet provided in the seat; and
   an outlet ventilation path selection switch disposed between the blower and the first and second outlets, the outlet ventilation path selection switch being a switch that selects at least one of the second ventilation path or the third ventilation path to which the air led through the first ventilation path is to be led,
   wherein the first inlet, the first ventilation path, the blower, the outlet ventilation path selection switch, the second ventilation path, the first outlet, the third ventilation path, and the second outlet are provided in the seat,
   the first inlet is provided vertically below the first outlet and the second outlet, and the air is drawn via the first inlet from a seating surface which is a seating side of the seat base and on which the person sits, and
   the first ventilation path is disposed in the seat base and leads from the first inlet to the outlet ventilation path selection switch via the blower.

2. The seat air-conditioning device according to claim 1, wherein the first outlet is disposed vertically below the second outlet.

3. The seat air-conditioning device according to claim 2, wherein the outlet ventilation path selection switch includes a first mode in which the air led through the first ventilation path is led to only the second ventilation path to be discharged from the first outlet.

4. The seat air-conditioning device according to claim 2, wherein the outlet ventilation path selection switch includes a second mode in which the air led through the first ventilation path is led to only the third ventilation path to be discharged from the second outlet.

5. The seat air-conditioning device according to claim 2, wherein the outlet ventilation path selection switch includes a third mode in which the air led through the first ventilation path is led simultaneously to both the second ventilation path and the third ventilation path to be discharged simultaneously from both the first outlet and the second outlet.

6. The seat air-conditioning device according to claim 1, further comprising:
   a controller that controls the blower and the outlet ventilation path selection switch,
   wherein the outlet ventilation path selection switch includes:
   a first mode in which the air led through the first ventilation path is led to only the second ventilation path to be discharged from the first outlet;
   a second mode in which the air led through the first ventilation path is led to only the third ventilation path to be discharged from the second outlet; and
   a third mode in which the air led through the first ventilation path is led simultaneously to both the second ventilation path and the third ventilation path to be discharged simultaneously from both the first outlet and the second outlet, and
   the controller switches the outlet ventilation path selection switch in mode, by selecting one of the first mode, the second mode, and the third mode.

7. The seat air-conditioning device according to claim 6, further comprising:
   at least one of a temperature sensor or a humidity sensor,
   wherein the controller switches the outlet ventilation path selection switch in mode, based on information indicating a temperature detected by the temperature sensor and information indicating a humidity detected by the humidity sensor.

8. The seat air-conditioning device according to claim 7, wherein the at least one of the temperature sensor or the humidity sensor is disposed in one of the first ventilation path and the outlet ventilation path selection switch.

9. The seat air-conditioning device according to claim 6, wherein when the blower is driven, the controller switches the outlet ventilation path selection switch firstly to the first mode, then to the second mode, and then to the third mode.

10. The seat air-conditioning device according to claim 9, wherein when the controller determines, based on at least one of the information indicating the temperature detected by the temperature sensor or the information indicating the humidity detected by the humidity sensor, that at least one of the temperature or the humidity is stabilized within a predetermined range, the controller switches the outlet ventilation path selection switch to the first mode.

11. The seat air-conditioning device according to claim 1, wherein the first ventilation path communicates with a second inlet different from the first inlet, and
the second inlet is disposed on a surface other than the seating surface of the seat.

12. The seat air-conditioning device according to claim 1, wherein the first outlet is disposed at a position corresponding to at least one of back or waist of the person, and
the second outlet is disposed at a position corresponding to at least one of a head, a neck, or a shoulder of the person.

13. The seat air-conditioning device according to claim 1, wherein the first inlet is provided in each of a center portion and an outer edge portion of the seating surface.

14. The seat air-conditioning device according to claim 13, wherein the outer edge portion is at least one of a rear portion or a front edge portion of the seating surface.

15. The seat air-conditioning device according to claim 6, further comprising:
a second inlet that is disposed at a position different from a position of the first inlet;
a fourth ventilation path that is connected to the second inlet; and
an inlet ventilation path selection switch that is connected to the first ventilation path and the fourth ventilation path,
wherein the inlet ventilation path selection switch is connected to the controller,
the blower is connected between the inlet ventilation path selection switch and the outlet ventilation path selection switch,
the inlet ventilation path selection switch includes: a fourth mode in which the first ventilation path is connected to the blower; a fifth mode in which the fourth ventilation path is connected to the blower; and a sixth mode in which the first ventilation path and the fourth ventilation path are connected to the blower, and
the controller switches the inlet ventilation path selection switch in mode, by selecting one of the fourth mode, the fifth mode, and the sixth mode.

16. The seat air-conditioning device according to claim 15, wherein the controller performs an operation procedure by (1) switching the inlet ventilation path selection switch to the fourth mode and switching the outlet ventilation path selection switch to the first mode, (2) switching the inlet ventilation path selection switch to the fifth mode and switching the outlet ventilation path selection switch to the second mode, (3) switching the inlet ventilation path selection switch to the sixth mode, (4) switching the inlet ventilation path selection switch to the fourth mode, and (5) switching the outlet ventilation path selection switch to the third mode.

17. The seat air-conditioning device according to claim 15, wherein when the inlet ventilation path selection switch is continuously kept in one of the fourth mode and the sixth mode for a first predetermined period, the controller switches the inlet ventilation path selection switch to the fifth mode and also alternates the outlet ventilation path selection switch between the first mode and the second mode, for a second predetermined period.

* * * * *